United States Patent
Bury et al.

(10) Patent No.: US 10,558,089 B2
(45) Date of Patent: *Feb. 11, 2020

(54) PHOTOALIGNMENT COMPOSITION

(71) Applicant: ROLIC AG, Zug (CH)

(72) Inventors: Izabela Bury, Allschwil (CH); Fabien Xavier Delbaere, Flaxlanden (FR); Olivier Muller, Lautenbach (FR); Joachim Reichardt, Grenzach-Wyhlen (DE); Hubert Seiberle, Weil am Rhein (DE); Peggy Studer, Buschwiller (FR); Satish Palika, Basel (CH)

(73) Assignee: ROLIC AG, Zug (CH)

( * ) Notice: Subject to any disclaimer, the term of this patent is extended or adjusted under 35 U.S.C. 154(b) by 137 days.

This patent is subject to a terminal disclaimer.

(21) Appl. No.: 15/602,701

(22) Filed: May 23, 2017

(65) Prior Publication Data

US 2017/0255064 A1    Sep. 7, 2017

Related U.S. Application Data

(63) Continuation of application No. 12/809,950, filed as application No. PCT/EP2008/010775 on Dec. 17, 2008, now Pat. No. 9,715,144.

(30) Foreign Application Priority Data

Dec. 21, 2007   (EP) ..................................... 07124024

(51) Int. Cl.
*G02F 1/1337*   (2006.01)
(52) U.S. Cl.
CPC ... *G02F 1/133788* (2013.01); *Y10T 428/1005* (2015.01); *Y10T 428/24479* (2015.01)
(58) Field of Classification Search
CPC ......... G02F 1/13378; Y10T 428/24479; Y10T 428/1005
See application file for complete search history.

(56) References Cited

U.S. PATENT DOCUMENTS

| | | | |
|---|---|---|---|
| 4,321,319 A * | 3/1982 | Shoji | C08G 73/1025 430/270.1 |
| 4,983,479 A | 1/1991 | Broer et al. | |
| 5,389,698 A | 2/1995 | Chigrinov et al. | |
| 5,539,074 A | 7/1996 | Herr et al. | |
| 5,567,349 A | 10/1996 | Kelly et al. | |
| 5,593,617 A | 1/1997 | Kelly et al. | |
| 5,602,661 A | 2/1997 | Schadt et al. | |
| 5,650,534 A | 7/1997 | Kelly et al. | |
| 5,800,733 A | 9/1998 | Kelly | |
| 5,833,880 A | 11/1998 | Siemensmeyer et al. | |
| 5,838,407 A | 11/1998 | Chigrinov et al. | |
| 5,851,424 A | 12/1998 | Kelly | |
| 5,851,427 A | 12/1998 | Kelly | |
| 5,965,761 A | 10/1999 | Buchecker et al. | |
| 6,027,772 A | 2/2000 | Han | |
| RE36,625 E | 3/2000 | Herr et al. | |
| 6,066,696 A | 5/2000 | Yu et al. | |
| 6,107,427 A | 8/2000 | Herr et al. | |
| 6,160,597 A | 12/2000 | Schadt et al. | |
| 6,201,087 B1 | 3/2001 | Herr et al. | |
| 6,215,539 B1 | 4/2001 | Schadt et al. | |
| 6,277,502 B1 | 8/2001 | Buchecker et al. | |
| 6,300,991 B1 | 10/2001 | Schadt et al. | |
| 6,307,002 B1 | 10/2001 | Okada | |
| 6,335,409 B1 | 1/2002 | Herr et al. | |
| 6,340,506 B1 | 1/2002 | Buchecker et al. | |
| 6,369,869 B2 | 4/2002 | Schadt et al. | |
| 6,395,351 B1 | 5/2002 | Benecke et al. | |
| 6,548,127 B1 | 4/2003 | Benecke et al. | |
| 6,608,661 B1 | 8/2003 | Schadt et al. | |
| 6,610,462 B1 | 8/2003 | Chien et al. | |
| 6,613,245 B1 | 9/2003 | Ohlemacher et al. | |
| 6,630,076 B1 | 10/2003 | Cherkaoui et al. | |
| 6,632,909 B2 | 10/2003 | Buchecker et al. | |

(Continued)

FOREIGN PATENT DOCUMENTS

| CN | 1187522 A | 4/1998 |
|---|---|---|
| CN | 1188133 A | 7/1998 |

(Continued)

OTHER PUBLICATIONS

Dong Hae Suh et al., "Polymethacrylates with benzylidenephthalimidine side chains, 1 Photochemical characteristics of model compounds and polymers", Macromol. Chem. Phys., 1998, pp. 363-373, vol. 199.

Dong-Hae Suh et al., "Polymethacrylates with benzylidenephthalimidine side chains, 2 Photocontrol of alignment of nematic liquid crystal", Macromol. Chem. Phys., 1998, pp. 375-383, vol. 199.

Hubert Seiberle et al., "Multidomain LCDs and Complex Optical Retarders Generated by Photo Alignment", Proceedings of EuroDisplay, Sep. 1999, 99, pp. 6-9.

K. Sakamoto et al., "Surface anisotropy of polyimide film irradiated with linearly polarized ultraviolet light", Applied Physics Letters, Apr. 13, 1998, vol. 72, No. 15.

Kunihiro Ichimura, "Photoalignment of Liquid-Crystal Systems", Chemical Reviews, 2000, pp. 1847-1873, vol. 100.

M. O'Neill et al., "Photoinduced surface alignment for liquid crystals displays", J. Phys. D: Applied Physics, 2000, pp. R67-R84, vol. 33.

(Continued)

*Primary Examiner* — Sophie Hon
(74) *Attorney, Agent, or Firm* — Sughrue Mion, PLLC

(57) ABSTRACT

The present invention relates to a photoalignment composition comprising a) 0.001 to 20%, by weight; preferably, 1 to 10% by weight, more preferably 1 to 9% by weight of at least one photoreactive compound (I) that comprises a photoalignment group and b) 80 to 99.999% by weight, preferably, 90 to 99% by weight, more preferably 91 to 99% by weight of at least one compound (II) that does not comprise a photoalignment group, and c) optionally at least one reactive or non reactive additives, and d) optionally at least one solvent. Further, the present invention relates to the use of this photoalignment composition for the alignment of liquid crystals or liquid crystal polymers, in electro-optical and optical elements, systems and devices.

9 Claims, No Drawings

(56) References Cited

U.S. PATENT DOCUMENTS

| | | | |
|---|---|---|---|
| 6,646,703 B1 * | 11/2003 | Seiberle | G02B 5/3016 349/124 |
| 6,649,230 B1 | 11/2003 | Seiberle et al. | |
| 6,676,851 B1 | 1/2004 | Buchecker et al. | |
| 6,717,644 B2 | 4/2004 | Schadt et al. | |
| 6,733,690 B1 | 5/2004 | Lukac et al. | |
| 6,746,729 B1 | 6/2004 | Cherkaoui et al. | |
| 6,749,771 B1 | 6/2004 | Cherkaoui et al. | |
| 6,833,421 B1 | 12/2004 | Marck | |
| 2002/0188075 A1 | 12/2002 | Park et al. | |
| 2003/0039768 A1 | 2/2003 | Buchecker et al. | |
| 2004/0138394 A1 | 7/2004 | Buchecker et al. | |
| 2004/0209008 A1 | 10/2004 | Liang et al. | |
| 2004/0265742 A1 | 12/2004 | Marck | |
| 2005/0040364 A1 | 2/2005 | Cherkaoui et al. | |
| 2005/0179006 A1 | 8/2005 | Imamura et al. | |
| 2006/0197068 A1 | 9/2006 | Schadt et al. | |
| 2006/0238693 A1 | 10/2006 | Yoon | |
| 2006/0280880 A1 | 12/2006 | Park | |
| 2007/0057230 A1 | 3/2007 | Suzuki et al. | |
| 2007/0232780 A1 | 10/2007 | Tamura | |
| 2008/0036946 A1 | 2/2008 | Ono et al. | |
| 2008/0069968 A1 | 3/2008 | Cherkaoui et al. | |
| 2008/0272334 A1 | 11/2008 | Liang et al. | |
| 2008/0274304 A1 | 11/2008 | Cherkaoui et al. | |
| 2008/0293888 A1 | 11/2008 | Bachels et al. | |
| 2009/0269513 A1 | 10/2009 | Nishiyama | |
| 2010/0048849 A1 | 2/2010 | Eckert et al. | |
| 2010/0059709 A1 | 3/2010 | Bachels et al. | |
| 2010/0266814 A1 | 10/2010 | Bury et al. | |

FOREIGN PATENT DOCUMENTS

| | | |
|---|---|---|
| CN | 1881016 A | 12/2006 |
| EP | 0 331 233 A2 | 9/1989 |
| EP | 0 763 552 A2 | 3/1997 |
| EP | 1 219 651 A1 | 7/2002 |
| EP | 1710617 A1 | 10/2006 |
| GB | 2 425 391 A | 10/2006 |
| JP | 772483 A | 3/1995 |
| JP | 2002265541 A | 9/2002 |
| JP | 2004264354 A | 9/2004 |
| JP | 2009109831 A | 5/2009 |
| TW | I513800 B | 12/2015 |
| WO | 95/24454 A1 | 9/1995 |
| WO | 96/10049 A1 | 4/1996 |
| WO | 98/52905 A1 | 11/1998 |
| WO | 99/15576 A1 | 4/1999 |
| WO | 99/37735 A1 | 7/1999 |
| WO | 99/64924 A1 | 12/1999 |
| WO | 00/05189 A1 | 2/2000 |
| WO | 00/07975 A1 | 2/2000 |
| WO | 00/04110 A1 | 7/2000 |
| WO | 00/39631 A1 | 7/2000 |
| WO | 00/48985 A1 | 8/2000 |
| WO | 00/55110 A1 | 9/2000 |
| WO | 00/59966 A1 | 10/2000 |
| WO | 00/63154 A1 | 10/2000 |
| WO | 01/07495 A1 | 2/2001 |
| WO | 01/53384 A1 | 7/2001 |
| WO | 03/027056 A1 | 4/2003 |
| WO | 2005/054406 A1 | 6/2005 |
| WO | 2006/039824 A1 | 4/2006 |
| WO | 2006/077723 A1 | 7/2006 |
| WO | 2007/033506 A1 | 3/2007 |
| WO | 2007/055316 A1 | 5/2007 |
| WO | 2007/071091 A1 | 6/2007 |
| WO | 2008/077261 A1 | 7/2008 |
| WO | 2008/135131 A1 | 11/2008 |
| WO | 2008/145255 A1 | 12/2008 |
| WO | 2009/080147 A1 | 7/2009 |

OTHER PUBLICATIONS

M. Schadt et al., "Optical patterning of multidomain LCDs", Journal of the SID, 1997, pp. 367-370.

Martin Schadt et al., "Optical patterning of multi-domain liquid-crystal displays with wide viewing angles", Nature, May 16, 1996, vol. 381, pp. 212-219.

Martin Schadt et al., "Surface-Induced Parallel Alignment of Liquid Crystals by Linearly Polymerized Photopolymers", Journal of Applied Physics, Jul. 1992, pp. 2155-2164, vol. 31, No. 7.

Masaki Obi et al., "Photocontrol of Liquid Crystal Alignment by Polymethacrylates with Diphenylacetylene Side Chains", Chem. Mater., 1999, pp. 1293-1301, vol. 11.

P.L. Egerton et al., "Photocycloaddition in Solid Poly(vinyl cinnamate). The Photoreactive Polymer Matrix as an Ensemble of Chromophore Sites", Macromolecules, 1981, pp. 95-100, vol. 14.

Shigeru Yamaki et al., "Photochemistry of polymethacrylates with styrylpyridine side chains and their photocontrollability of liquid crystal alignment", Journal of Photopolymer Science and Technology, pp. 279-282, vol. 12, No. 2.

Soyoung Song et al., "Photoalignment Films of Polyesters with Photoreactive Main Chain", Journal of Applied Physics, May 1998, pp. 2620-2624, vol. 37, Part 1, No. 5A.

Yutaka Makita et al., "Photo Alignment Materials with High Sensitivity to Near UV Light", Journal of Photopolymer Science and Technology, 1998, pp. 187-192, vol. 11, No. 2.

Medvedev et al., "Phase Behavior and Photooptical Properties of Liquid Crystalline Functionalized Copolymers with Low-Mass Dopants Stabilized by Hydrogen Bonds", Macromolecules, Feb. 8, 2005, vol. 38, No. 6, pp. 2223-2229.

Voloshchenko, Control of an Easy-Axis on Nematic-Polymer Interface by Light Action to Nematic Bulk, 1995, Jpn. J. Appl. Phys., vol. 34, pp. 566-571.

Iimura et al., Alignment Control of a Liquid Crystal on a Photosensitive Polyvinylalcohol Film, Jpn. J. Appl Phys, 1993, vol. 32, pp. L93-L96.

* cited by examiner

PHOTOALIGNMENT COMPOSITION

CROSS REFERENCE TO RELATED APPLICATIONS

This is a continuation of application Ser. No. 12/809,950 filed Jun. 21, 2010, which is the National Stage of PCT/EP2008/010775 filed Dec. 17, 2008 (which claims priority of European Patent Application No. 07124024.6 filed Dec. 21, 2007), the disclosure of which is incorporated herein by reference.

The present invention relates to a photoalignment composition especially for the alignment of liquid crystals or liquid crystal polymers comprising a) 0.001 to 20%, by weight, preferably, 0.05 to 10% by weight, more preferably 0.1 to 9% by, especially more preferred 0.1 to 5%, more especially more preferred 0.1 to 2% weight of at least one photoreactive compound (I) that comprises a photoalignment group and b) 80 to 99.999% by weight, preferably, 90 to 99% by weight, more preferably 91 to 99% by weight of at least one compound (II) that does not comprise a photoalignment group, and c) optionally at least one reactive or non reactive additives, and d) optionally at least one solvent.

Further the present invention relates to the use of this photoalignment composition for the alignment of liquid crystals or liquid crystal polymers, in electro-optical and optical elements, systems and devices.

Liquid crystal devices are more and more used in many different applications. Examples are optical films, in particular polarizing films and retardation films, as well as security devices for preventing forgery, counterfeiting and copying and liquid crystal displays (LCD).

Liquid crystal displays (LCDs) are becoming increasingly dominant in advanced visualization devices. LCDs offer favourable characteristics with respect to image quality (high luminance, high resolution, colour and grey scale capability), power consumption as well as dimensions and weight (flat panel displays). The use of commercial LCDs has become widespread, e.g. in automotive and telecommunication instruments, as well as in monitors of notebooks, desktop computers, television sets, etc. Today the need for LCDs in television applications is rapidly growing. Recently developed LCD modes possess high potentials in achieving fast response times, wide viewing angles and high luminance. Amongst other newly developed LCD modes, the MVA (multi-domain vertical alignment) mode appears to be the most promising for the use in modern television applications. In the MVA mode the liquid crystal molecules are usually nearly vertically aligned with respect to the surface of the substrates. By using protrusions (or other alignment subdivisions) on the surface of the substrate, the liquid crystal molecules become locally pre-tilted within a single cell in more than one direction, leading to domains switchable in different directions. This multi-domain configuration exhibits very good display performance, with wide viewing angles of up to 160° in any direction, short response times (below 20 ms), high contrast ratios (up to 700:1) and high brightness. However, by means of using protrusions only, it is difficult to clearly define the domain space within a single pixel. Therefore the MVA mode demands additional manufacturing steps to ensure shape effects as well as electrical field effects on both the upper and lower substrate; hence all in all leading to complex manufacturing procedures. In order to by-pass this technical challenge, the availability of an alignment layer would be desirable, which directly leads to pre-defined alignment directions within each pixel domain and having well controllable off-axis angles with respect to the normal axis of the substrate.

The successful functioning and performance of a liquid crystal device or optical film relies on the ability of the liquid crystal molecules within that device or film to adopt an alignment imposed upon them. Alignment of the liquid crystal molecules is achieved by use of an alignment layer which defines a direction of orientation for the liquid crystal molecules with the result that the longitudinal axes of the molecules become aligned with the direction of orientation defined by the alignment layer. In addition to this directional alignment, for some applications, the alignment layer should also be able to impart to the liquid crystal molecules an angle of tilt so that the molecules align themselves at an angle out of the surface of the alignment layer.

A well known method for preparing alignment layers is a rubbing treatment wherein a high molecular resin film such as polyimide is rubbed in a single direction with a cloth. The liquid crystal molecules adjacent to the rubbed surface are aligned in the rubbing direction. However, alignment films formed by rubbing have some disadvantages like dust generation and scratches, which occur during the rubbing process. In addition, rubbing methods are not adequate for the production of structured layers, i.e layers having small areas with different alignment directions.

These problems can be solved using liquid-crystal alignment control processes other than rubbing such as oblique deposition, photolithographic, Langmuir Blodgett film, ion irradiation, high velocity fluid jet and other processes. However, most of these processes are not practical for processing large-area substrates.

Other methods developed for the alignment of liquid crystals are alignment layers made by photo-orientation methods (usually using linearly polarized light), and especially well suited are linearly photo-polymerized (LPP) alignment layers, also known as photo-oriented polymer networks (PPN). Such methods are for instance disclosed in U.S. Pat. Nos. 5,389,698, 5,838,407, 5,602,661, 6,160,597, 6,369,889, 6,717,644, 6,215,539, 6,300,991, and 6,608,661. These methods allow the generation of homogeneous alignment of liquid crystals. In the LPP process, which is a non-contact technique, alignment films similar to those obtained by rubbing can be obtained with high reproducibility by irradiating a photosensitive film on a large substrate area with polarized light. In addition, it is possible to vary the direction of orientation and the azimuthal and polar tilt angle within the photoreactive layer by controlling the direction of the irradiation of the linearly polarized light. By selectively irradiating specific regions of the photoreactive material, it is possible to align very specific regions of the layer and thus to provide alignment areas having different orientation which gives rise to structured alignment layer as described for example in Jpn, J. Appl. Phys., 31 (1992), 2155-64 (Schadt et al.). Using the linearly photo-polymerizable alignment (LPP) technique, the possibility of realizing a four-domain vertical aligned nematic (VAN) LCD was demonstrated some years ago (K. Schmitt, M. Schadt; Proceedings of EuroDisplay 99, 6-9 Sep. 1999). The four-domain VAN-LCD exhibits an excellent off-state angular brightness performance.

It is thus an object of the present invention to provide further photoalignment materials.

Thus, the present invention relates to a photoalignment composition comprising a) 0.001 to 20%, by weight, preferably, 1 to 10% by weight, more preferably 1 to 9% by weight of at least one photoreactive compound (I) that comprises a photoalignment group and b) 80 to 99.999% by weight, preferably, 90 to 99% by weight, more preferably 91 to 99% by weight of at least one compound (II) that does not comprise a photoalignment group, and c) optionally at least one reactive or non reactive additives, and d) optionally at least one solvent.

In the context of the present invention compound (II) are preferably monomer(s), oligomer(s), dendrimer(s), polymers, copolymers or prepolymer(s), more preferred are polymers or copolymers.

Preferably compound (II) is poly-acrylate, -methacrylate, -imide, -amic acid, -amide, -ethylene, -ethyleneoxid, -propylene, -vinyl chloride, -ethylene terephthalate, -styrene, -carbonate, -actic acid, -urethan, -ester, -ether, -silicon, more preferred is poly-acrylate, -methacrylate, -imide, -amic acid, -amide, -acetals, -(amide-imide)s, -acrylates, -(ether etherketone)s, -(ether-imide)s, -(phenylene oxide)s, -(phenylene sulfide)s, -sulfones; especially polyamic acid and/or polyimide.

More preferred compound (II) is
Poly(3,3',4,4'-benzophenonetetracarboxylic dianhydride-co-4,4'-oxydianiline/1,3-phenylenediamine), amic acid
Poly(3,3',4,4'-benzophenonetetracarboxylic dianhydride-co-4,4'-oxydianiline/1,3-phenylenediamine), amic acid
Poly(pyromellitic dianhydride-co-4,4'-oxydianiline), amic acid
Poly(3, 3',4,4'-benzophenonetetracarboxylic dianhydride-co-4,4'-oxydianiline/1,3-phenylenediamine), amic acid
Poly(3,3',4,4'-benzophenonetetracaboxylic dianhydride-co-4,4'-oxydianiline/1,3-phenylenediamine), amic acid
Poly(pyromellitic dianhydride-co-4,4'-oxydianiline), amic acid;
or
polyimide, polyamide or polyamic acid of the below given diamines and dianhydrids,
such as
aromatic diamines:
such as for example diamino diphenyl derivatives, such as 4,4'-diaminodiphenyl ether, 4,4-diamino-2,2'-dichlorodiphenyl disulfide, 4,4'-diaminodiphenyl sulfone, 4,4'-diaminodiphenylmethane, 4,4'-diaminodiphenylamine sulfate, 3,3'-diaminodiphenylmethane, 3,4'-diaminodiphenylmethane, 3,3'-diaminodiphenyl sulfone, 4,4'-diaminodiphenyl sulfide, 3,4'-diaminodiphenyl ether, 3,3'-dinitro-4,4'-diaminodiphenyl sulfone, 3, 3',4,4'-tetraaminodiphenylsulfone, 3, 3-diamino diphenyl urea, 4,4-diamino diphenyl urea, 4,4-diamino diphenyl-2-sulphonic acid,
4,4'-diamino-diphenylene-cycylohexane, 4,4'-diaminodiphenylamine-2,2-disulphonic acid,
4,4'-diamino-5,5'-dimethyl-2,2'-biphenyl disulfonic acid disodium salt,
4,4'-diamino-3,3'-dinitrodiphenyl ether, 4,4'-diamino-3,3'-dimethyldiphenyl methane, 3,3'-diamono-4,4'-dichlorodiphenyl sulfone;
or
diaminofluorene, such as 2,7-diaminofluorene, 9,9-bis(4-aminophenyl)fluorine, 3,7-diamino-2-methoxyfluorene, 2,7-diaminofluorene dihydrochloride;
or
diaminoanthraquinone, such as 1,5-diaminoanthraquinone, 1,8-diamino-4,5-dihydroxyanthraquinone, 2,6-diaminoanthraquinone, 1,5-diamino-4,8-dihydroxyanthraquinone, 4,5'-diamino-(1,1')bianthracenyl-9,10,9',10'-tetraone;
or
diaminobiphenyl, such as 4,4'-diaminooctafluorobiphenyl, 3,4'-diaminobiphenyl, 2,2'-biphenyldiamine, 4,4'-diamino-5,5'-dimethyl-2,2'-biphenyldisulfonic acid, 3,3'-diamino-4,4'-dihydroxybiphenyl,
4,4'-bis(4-aminophenoxy)biphenyl, 4,4-diamino-2,2'-biphenyldisulfonic acid, 2,3',4,5-pentaphenyl-3,4'-biphenyldiamine;
or
benzidine derivatives such as 3,3',5,5'-tetramethylbenzidine; benzidines mixture, benzidine 3,3'-dichlorobenzidine dihydrochloride, benzidine dihydrochloride, 3, 3'-dihydroxybenzidine, 3, 3'-dinitrobenzidine, benzidine sulfate,3,3'-dichlorobenzidine, 3,3'-diaminobenzidine tetrahydrochloride, 3, 3'-dimethoxybenzidine, 3,3',5,5'-tetramethylbenzidine dihydrochloride, 2-nitrobenzidine, 3-methylbenzidine dihydrochloride, 3,3'-diethylbenzidine dihydrochloride, benzidine-3-sulfonic acid, 2,2',5,5'-tetrachlorobenzidine, 2, 2'-dichloro-5,5'-dimethoxybenzidine, 3-methoxybenzidine, 3,3',5, 5'-tetramethylbenzidine dihydrochloride hydrate, 3, 3'-diaminobenzidine tetrahydrochloride dihydrate, 2,2'-dimethylbenzidine hydrochloride, 2,2'-bis(trifluoromethyl)benzidine, tetramethylbenzidine;
or
diamino bibenzyl derivatives such as 4,4'-diamino-2,2'-dimethylbibenzyl, 2,2'-diamino-4,4'-difluorobibenzyl, 3,5,3',5'-tetrabromo-biphenyl-4,4'-diamine;
or
aniline derivative such as 4-[4-(4-aminophenoxy)-2,3,5,6-tetrafluorophenoxy]aniline, 4-[1-(4-aminophenyl)-1-methylethyl]aniline, 2-((5-(2-aminophenyl)thio-3,4-dinitro-2-thienyl)thio)aniline, 2,2'-dithiodianiline, 4,4'(1,3-phenylenediisopropylidene)bisaniline, 2-[2-(2-aminophenyl)diaz-1-enyl]aniline, 2,2'-(phenylmethylenebis)bis(4-methylaniline), 4,4'-methylene-bis(2-chloroaniline), 2,2'-oxydianiline, 2-((6-[(2-aminophenyl)sulfanyl]-5-nitro-2-pyridyl)sulfanyl) aniline,tetrabromo methylenedianiline, 4,4'-azodianiline, 4-[3-(4-aminophenoxy)propoxy]aniline, 2,2'-ethylenedianiline diphosphate, chrysaniline, 4,4'-dithiodianiline, 4,4'-ethylenedianiline, pararosaniline acetate, 3,3'-(decamethylenedioxy)dianiline, 3-nitro-4,4'-methylenedianiline,3,3'(pentamethylenedioxy)dianiline, 4-(p-aminoanilino)-3-sulfoaniline, 4,4'-methylenebis(3-chloro-2,6-diethylaniline), 4,4'-methylene-bis-(2,6-diethylaniline), 4,4'-methylenebis-(2,6-diisopropylaniline), 2,2'-(hexamethylenedioxy)dianiline, 2, 2'-(pentamethylenedioxy)dianiline, 2,2'-(ethylenedoxy)dianiline, 4-[4-(4-aminophenoxy)butoxy]aniline, 2-([2-[(2-aminophenyl)thio]-6-nitro-4-(trifluoromethyl)phenyl)]thio) aniline
2-[(3-([(2-aminophenyl)thio]methyl)-2,4,6-trimethylbenzyl)thio]aniline,
3-[3-amino-5-(trifluoromethyl)benzyl]-5-(trifluoromethyl) aniline,
2-((5-[2-(aminophenyl)thio]-4-chloro-2-nitrophenyl)thio) aniline,
4-(1-(4-aminophenyl)-2-[4-(dimethylamino)phenyl]vinyl) aniline;
or
diamino acridine derivative such as 3,6-acridinediamine, 3,6-diaminoacridine hemisulfate, hemihydrate, 3,6-diaminoacridine hydrochloride, 3,6-diamino-10-methylacridinium chloride, 3,6-diamino-10-methylacridinium chloride hydrochloride;

or diamino stilbene derivative such as 4,4'-diaminostilbene dihydrochloride, 4,4'-diaminostilbene-2,2'-disulfonic acid;
or diamino benzophenone derivative such as 33'-diaminobenzophenone;
or
pararosaniline hydrochloride
2,2'-dithiobis(1-naphthylamine)
propidium iodide
o-dianisidine dihydrochloride
proflavine dihydrochloride
o-tolidine dihydrochloride
proflavine hemisulfate
or
o-tolidine
2,2-bis[4-(4-aminophenoxy)phenyl]hexafluoropropane
4, 4'-diamino-1,1'-dianthramide
3-amino-4-hydroxyphenyl sulfone
4,4-bis-(3-amino-4-hydroxyphenyl)-valeric acid
2-amino-4-chlorophenyl disulfide
4,4'-diaminobenzanilide
n, n'-bis(3-aminophenylsulfonyl)ethylenediamine
proflavine hemisulphate
phenosafranin
4,4'-diaminobozophenone
2,2-bis(4-aminophenyl)hexafluoropropane
2,2-bis(3-amino-4-hydroxyphenyl)hexafluoropropane
2,2-bis(3-amino-4-methylphenyl)hexafluoropropane
2,2-bis[4-(4-aminophenoxy)phenyl]propane
1,4-bis(4-aminophenoxy)benzene
1,3-bis(4-aminophenoxy)benzene
bis(4-(4-aminophenoxy)phenyl)sulfone
o-tolidine sulfone
3,6-thioxanthenediamine-10,10-dioxide
2,5-bis-(4-aminophenyl)-(1,3,4)oxadiazole
3,3'-dimethylnaphthidine
1,3-bis(3-aminophenoxy)benzene
4,4"-diamino-1,1'-binaphthyl
diamine bordeaux
benzoflavin
2,2'-thiobis(5-aminobenzenesulfonic acid)
benzidine pyrophosphate
3,6-diaminothioxanthene-10-dioxide, dihcl
4,4"'-diamino-p-terphenyl
bis(p-aminophenoxy)dimethylsilane
bis[4-(3-aminophenoxy)phenyl]sulfone
4,4'-methylenedi-2,6-xylidine
2-aminobenzaldehyde-ethylene-diamine
toluylenediamine
3,8-diamino-6-phenylphenanthridine
thionin perchlorate
dihydroethidium
thionin
4,4-diamino benzene sulfonyl anilide
o-dianisidine hcl
2, 2'-diamino-4'-methoxy-4-methylbenzanilide
5,5'-dimethyl-2,2-dinitrobenzidine
n,n'-bis(2-aminophenyl)-1,3-propanediamine
3,4'-diaminochalcone
2-([1-(4-(1-[(2-aminophenyl)thio]-2-nitroethyl)phenyl)-2-nitroethyl]thio)an ilin
2-((2-[(2-aminophenyl)thio]ethyl)thio)aniline
2-((4-[(2-aminophenyl)thio]but-2-enyl)thio)aniline
2,2-diamino-bibenzyl
trimethylene bis(4-aminobenzoate)
fluoresceinamine
1,6-diaminopyrene
1,8-diaminopyrene
3,6-diaminocarbazole
4,4'(5')-diamino-[2,4]-dibenzo-18-crown-6,dihydrochloride
4,4'-diaminostilbene-2,2'-disulfonic acid, disodium salt
(r)-(+)-2,2'-diamino-1,1'-binaphthyl
proflavine hemisulfate dihydrate
dimdium bromide monohydrate
o-tolidine dihydrochloride hydrate
3,6-[bis(4-amino-3-(sodiumsulphonato)phenlamino)]-2,5-dichloro 4-benzoquinone
2,7-diamino-9-fluorenone
n,n'-bis(2-aminophenyl)oxamide
n,n'-bis(4-aminophenyl)-1,3-bis(aminomethyl)benzene, dihydrochloride
4',4"(5")-diaminodibenzo-15-crown-5
bis(4-amino-2,3-dichlorophenyl)methane
alpha,alpha'-bis(4-aminophenyl)-1,4-diisopropylbenzene
2,2-bis(3-aminophenyl)hexafluoropropane
3,10-diamino-6,13-dichlorobenzo[5,6][1,4]oxazino[2,3-b] phenoxazine-4,11-dis ulfo
n1-(2-amino-4-methylphenyl)-2-aminobenzamide
n1-(2-amino-4-chlorophenyl)-2-aminobenzamide
2,2'-dichloro[1,1'-biphenyl]-4,4'-diamine
4,4'(5')-diaminodibenzo-15-crown-5 dihydrochloride
bis-(4-amino-3-nitro-phenyl)-methanone
bis-(3-amino-4-chloro-phenyl)-methanone
bis-(3-amino-4-dimethylamino-phenyl)-methanone
n,n'-bis-(4-amino-2-chloro-phenyl)-isophthalamide
n,n'-bis-(4-amino-2-chloro-phenyl)-terephthalamide
3,9-diamino-1,11-dimethyl-5,7-dihydro-dibenzo(a,c)cyclohepten-6-one
2-aminobenzaldehyde n-[(z)-(2-aminophenyl)methylidene] hydrazone
3,3'-bis(trifluoromethyl)benzidine
dicarboxidine 2 hcl
1,4-phenylenebis[[4-(4-aminophenoxy)phenyl]methanone]
n'1-(2-aminobenzoyl)-2-aminobenzene-1-carbohydrazide
2-[4-(5-amino-1h-benzimidazol-2-yl)phenyl]-1h-benzimidazol-5-amine
bis(4-aminophenyl)acetylene
dibenzo(1,2)dithiine-3,8-diamine
ethidium homodimer-2
4,4'-bis-(2-aminobenzenesulfonyl)bis-phenolester
neapentyl glycol bis(4-aminophenyl) ether
3,3'-tolidine-5-sulfonic acid
n1-(3-[(2-aminobenzoyl)amino]propyl)-2-aminobenzamide
2-((6-amino-1,3-benzothiazol-2-yl)dithio)-1,3-benzothiazol-6-ylamine
2-([6-[(2-aminophenyl)sulfanyl]-3,5-di(trifluoromethyl)-2-pyridyl]sulfanyl) anil
3,6-diaminothioxanthene-10-dioxide dihydrochloride
m-tolidine dihydrochloride hydrate
2-amino-n-[2-amino-4-(trifluoromethyl)phenyl]-5-methylbenzamide
1,5-bis(4-aminophenoxy)pentane
2,3'-dichlorobenzidine dihydrochloride
3-(bis-(4-amino-phenyl)-methyl)-2,3-dihydro-isoindol-1-one
alicyclic diamines:
4,4'-methylenebis(cyclohexylamine)
4,4'-methylenebis(2-methylcyclohexylamine)
aliphatic diamines:
1, 8-diamino-p-menthane
4,4'-methylenebis(cyclohexylamine)
d-cystine
l-cystine dimethyl ester dihydrochloride
neamine bis(2-aminopropyl)amine
(h-cys-beta-na)2 2 hot
l-cystine dibenzyl ester ditosylate
1,4-diaminocyclohexane
(h-cys-pna)2
dl-2-aminopropionic anhydride
l-cystine(di-b-naphthylamide)hydrochloride
l-cystine-bis-p-nitroanilide dihydrobromide
l-cystine diethyl este r dihydrochloride
trans-1,4-cyclohexanediamine
4,4'-methylenebis(2-methylcyclohexylamine)
l-leucinethiol, oxidized dihydrochloride
1,3-diaminoadamantane dihydrochloride
l-leucinethiol disulfide 2 hcl
l-cystine disodium salt, monohydrate
l-homocystine methylester hydrochloride
l-admantanediamine
tetracyclo[8.2.1.1(8,11).0(2, 7)]tetradeca-2,4,6-triene-10, 11-diamine
tricyclo[3.3.1.0(3,7)]nonane-3,7-diamine.

The polyimides and polyamic acids of the invention preferably comprise dianhydride selected from the group given below:

tetrahydro-2, 5-dioxa-cyclobutadicyclopentene-1,3,4,6-tetraone
pyromellitic dianhydride
3,3',4,4'-benzophenonetetracarboxylic dianhydride
1,4,5,8-naphthalenetetracarboxylic dianhydride
3,4,9,10-perylenetetracarboxylic dianhydride
tetrahydrofuran-2,3,4,5-tetracarboxylic dianhydride
4-(2,5-dioxotetrahydrofuran-3-yl)-tetralin-1,2-dicarboxylic anhydride
cis,cis,cis,cis-1,2,3,4-cyclopentanetetracarboxylic dianhydride
3,3',4,4'-biphenyltetracarboxylic dianhydride
5-(2,5-dioxotetrahydrofuryl)-3-methyl-3-cyclohexene-1,2-dicarboxylic anhydride
4,4'-(hexafluoroisopropylidene)diphthalic anhydride
4,4'-oxydiphthalic anhydride
3,3',4,4'-diphenlysulfonetetracarboxylic dianhydride
bicyclo[2.2.2]oct-7-ene-2,3,5,6-tetracarboxylic dianhydride
1,2,3,4-cyclopentanetetracarboxylic dianhydride
ethylene maleic anhydride
1,14-dimethyl-4,10-dioxatetracyclo[5.5.2.0(2,6).0(8, 12)]tetradec-13-ene-3,5,9,1
ethylenediaminetetraacetic dianhydride
bicyclo[2.2.2]octane-2,3,5,6-tetracarboxylic dianhydride
ethylene glycol bis(trimellitic anhydride)
tricyclo(4.2.2.0(2,5))dec-9-ene-3,4,7,8-tetracarboxylic dianhydride
4,4'-(4,4'-isopropylidendiphenoxy)bis(phthalic anhydride)
4,5,9,10-tetrabromo-isochromeno(6,5,4-def)isochromene-1, 6,8-tetraone
(5,1',1',5")terisobenzofuran-1,3,3',1'',3"-pentaone
meso-butane-1,2,3,4-tetracarboxylic dianhydride
bicyclo[2.2.2]-oct-7-ene-2,3:5,6-tetra-carboxylic dianhydride
3, 7-dimethyl-11,16-dioxapentacyclo[6.5.5.0(1,6).0(9,13).0(14,18)]octadec-6-ene-1
3,9-dioxa-spiro(5.5)undecane-2,4,8,10-tetraone
1,4-ethano-8-me-144a566a78-octa-h-bz(c)phenanthren-5613,14-tetr-co2h dianhydride;
and
copolymers of more than two of the foregoing polymers.

Further preferred Is compound (I), which is a polyimide or polyamic acid selected from the group consisting of poly(pyromellitic dianhydride-4,4'-oxydiamine), poly(pyromellitic dianhydride-2,2-bis([-(4-aminophenoxy)phenyl)-hexafluoropropane), poly (pyromellitic dianhydride-2,2-bis (4-aminophenoxyphenyl) propane), poly(1,2,3,4-cyclobutanetetracarboxylic acid-4,4'-oxydiamine), poly(1,2,3,4-cyclobutanetetracaboxylic acid-2,2-bis-(4-(4-aminophenoxy) phenyl]-hexafluoropropane), poly(1,2,3,4-cyclobutanetetracarboxylic acid-2,2-bis(4-aminophenoxyphenyl-propane), poly(2,2-bis(3,4-dicarboxyphenyl)hexafluoropropane dianhydride-4,4'-oxydiamine), poly(2,2-bis(3,4-dicarboxyphenyl) hexafluoropropene dianhydride-2,2-bis[4-(4-aminophenoxy)phenyl]-hexafluoropropane), poly(2,2-bis(3,4-dicarboxyphenyl)hexafluoropropane dianhydride-2,2-bis(4-aminophenoxyphenyl)propane), poly(pyromellitic dianhydride-2,2-bis[4-(4-aminophenoxy)phenyl]-hexafluoropropane)-4, 4'-oxydiamine), Poly(3,3',4,4'-benzophenonetetracarboxylic dianhydride-co-4,4'-oxydianiline/1,3-phenylenediamine), amic acid; Poly(3,3',4,4'-benzophenonetetracarboxylic dianhydride-co-4,4'-oxydianiline/1,3-phenylenediamine), amic acid; Poly(pyromellitic dianhydride-co-4,4'-oxydianiline), amic acid: Poly(3,3',4,4'-benzophenonetetracarboxylic dianhydride-co-4,4'-oxydianiline/1,3-phenylenediamine), amic acid; Poly(3,3',4,4'-benzophenonetetracarboxylic dianhydride-co-4,4'-oxydianiline/1,3-phenylenediamine), amic acid; Poly(pyromellitic dianhydride-co-4,4' oxydianiline), amic acid,
and copolymer of more than two of the monomers used for the preparation of said polymers.

In the context of the present invention "photoalignment groups" are anisotropically absorbing groups useful in the preparation of alignment layers.

In a preferred embodiment of the present invention the photoalignment groups induce anisotropic molecular alignment of liquid crystals by irradiation with aligning light.

Preferred photoalignment groups dimerize and/or to undergo trans-cis isomerisation or which are able to photodegradate, preferably they are able to undergo trans-cis isomerisation and/or dimerize and more preferably they are able to dimerize.

In the context of the present invention the wording "photo-degradate" is attributed to the anisotropic depolymerization of a polymer, preferably polyimide.

These photoreactions are for example described in J. Phys. D: Appl. Phys., 33, R67-R84 (2000).

Preferred photoreactive compounds (I) are monomer(s), oligomer(s), dendrimer(s), polymers, copolymers or prepolymer(s), more preferred are polymers or copolymers.

In the context of the present invention:
the terms "polymer" and "copolymer", refer to a monomer with a higher molecular weight, typically higher than 5000 g/mol;
the terms "oligomer" and "prepolymer" refer to a monomer with a higher molecular weight, typically lower than 5000 g/mol;
the term "dendrimer" refers to a molecule comprising perfectly branched repeat units in layers emanating radially from a point-like core.

In the context of the invention polymer denotes homo- or hetero-polymer, copolymer or prepolymer.

Preferably the photoreactive compounds (I) are polymers, preferably poly-acrylate, -methacrylate, -imide, -amic acid, -amide, -ethylene, -ethyleneoxid, -propylene, -vinyl chloride, -ethylene terephthalate, -styrene, -carbonate, -actic acid, -urethan, -ester, -ether, -silicon, more preferred is poly-acrylate, -methacrylate, -imide, -amic acid, -amide, -acetals, -(amide-imide)s, -acrylates, -(ether etherketone)s, -(ether-imide)s, -(phenylene oxide)s, -(phenylene sulfide)s, -sulfones and mixtures thereof;

And more preferably the polymers of (1) are polyamic acid and/or polyamic acid.

Further more preferred are photoreactive compound (I) comprising photoalignment groups, which are radicals of alpha, beta-unsaturated-carbonyl groups, preferably ciannamates, coumarine, quinolone, cyanostilbene, chalcone, diphenylacetylene, benzylidenephtalimidine, benzylideneacetophenone, phenylenediacryloyl, stilbazole, azo, polyimides and their derivatives; especially cinnamate; coumarin, anthraquinone, mericyanine, methane, 2-phenylazothiazole, 2-phenylazobenzthiazole, quinolone, diarylketones, such as benzophenone such as 4,4'-diaminobenzophenone, 4,4'-bis(trifluoromethyl)benzophenone, 3,4'-bis/trifluoromethyl)benzophenone, 3,3'-bis(trifluoromethyl)benzophenone; benzophenone imine; the phenylhydrazones of benzophenone, 4'-bis(trifluoromethyl)benzophenone, 3,4'-bis/trifluoromethyl)benzophenone or 3,3'-bis(trifluoromethyl)benzophenone; 2,4-diaminiophenylhydrazones of benzophenone, 4'-bis(trifluoromethyl)benzophenone, 3,4'-bis/trifluoromethyl)benzophenone or 3,3'-bis(trifluoromethyl)benzophenone; phenylhydrazones, semicarbazones; benzylidenephtalimidine, benzylideneacetophenone, phenylenediacryloyl, diphenylacetylene, stilbene, 1,4-bis(2-phenylethylenyl)benzene, 4,4'-bis(arylazo)stilbenes, perylene, 4,8-diamnion-1,5-naphthoquinone, cyanostilbene, diphenylacetylene, chalcone, stilbazole, organic azos, such as arylazo, di(arylazo), tri(arylazo), tetra(arylazo), penta (arylazo), reversible azo-containing polymers.

Further most preferred are photoreactive compound (I) comprising photoalignment groups, which are radicals of alpha, beta-unsaturated-carbonyl groups, preferably cinnamates, coumarine, quinolone, cyanostilbene or chalcone, In the context of the invention, the term liquid crystal denotes liquid crystal or liquid crystal polymer or liquid crystal pre-polymer.

Liquid crystal polymer or liquid crystal pre-polymer are for example LC242, (manufactured by BASF Corp., with a trade name of LC246), or those disclosed in WO00/48985, WO00/55110, WO99/37735, WO00/39631 (Mon1, Mon2, Mon3 on page 5), WO99/64924, WO99/37735, WO05/054406, WO0104110, WO00/05189, WO03/027056, WO9852905, U.S. Pat. Nos. 5,800,733, 5,851,424, 5,851,427, 5,593,617, 5,567,349, which are herewith incorporated by reference.

More preferred photoreactive compounds (I) comprise photoalignment groups, which are substituted or unsubstituted and preferably alpha, beta-unsaturated-carbonyl groups, especially those photoalignment groups of formula II; Ill and IV respectively
wherein

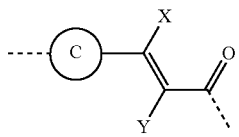

(II)

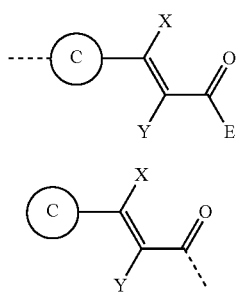

(III)

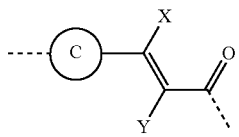

(IV)

the broken line indicates the linkage in the photoreactive compound respectively;

C represents an aromatic group which is unsubstituted or substituted by fluorine, chlorine or cyano, or by a cyclic, straight-chain or branched alkyl residue which is unsubstituted, mono-substituted by cyano or halogeno, or poly-substituted by halogeno, having 1 to 18 carbon atoms and wherein one or more non adjacent $CH_2$ groups may independently be replaced by Q, wherein Q represents —O—, —CO, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH=CH—, —C≡C—, —O—CO—O—, and —Si(CH$_3$)$_2$—O—Si(CH$_3$)$_2$—, an aromatic and an alicyclic group;

E represents —OR$^4$, —NR$^5$R$^6$, or an oxygen atom linked to ring C in the ortho-position to form a coumarin unit, wherein R$^4$, R$^5$ and R$^6$ are a hydrogen atom or a cyclic, straight-chain or branched alkyl residue which is unsubstituted, mono-substituted by halogeno, or poly-substituted by halogeno, having 1 to 18 carbon atoms and wherein one or more $CH_2$ groups may independently be replaced by —O—, —CO—, —CO—O—, —O—CO—, —CH=CH—, with the proviso that oxygen atoms are not directly attached to each other, or R$^5$ and R$^6$ are linked together to form an alicyclic ring with 5 to 8 atoms; and X, Y each independently of the other represents hydrogen, fluorine, chlorine, cyano, alkyl optionally substituted by fluorine having from 1 to 12 carbon atoms in which optionally one or more non-adjacent $CH_2$ groups are replaced by —O—, —CO—O—, —O—CO— and/or —CH=CH—; and more especially preferred are cinnamate groups and its derivatives, especially those of formulae:

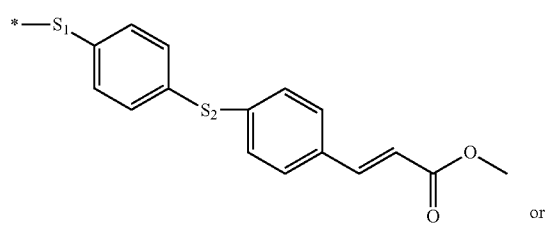

or

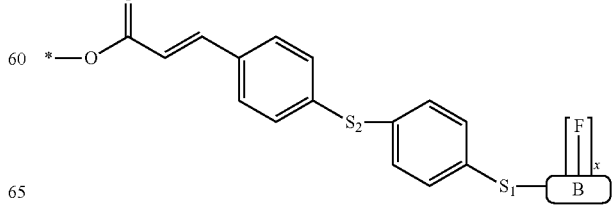

and more especially those of formulae:

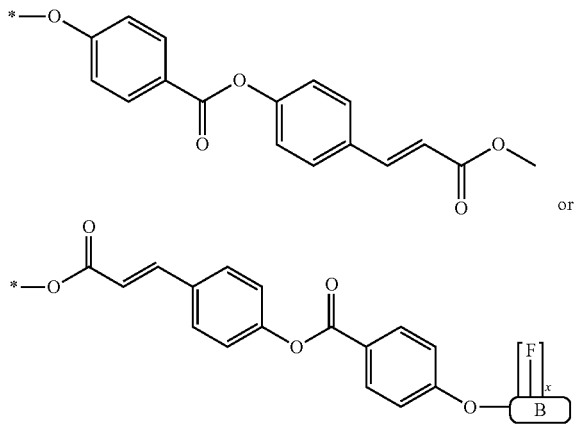

whereby the aromatic rings are unsubstituted or substituted and
wherein the compound residue (Ia)

 (Ia)

represents a straight-chain or branched $C_1$-$C_{16}$fluoralkyl group, wherein
F is fluorine, and
x is an integer from 0 to 15, preferably an integer from 0 to 10; more preferably 0, 1, 2, 3, 4, 5, 6, 7, 8 or 9 and most preferred 0 or 3, 4, 5 or 7;
B represents a straight-chain or branched $C_1$-$C_{18}$alkyl group, which is in addition to its fluorine substituent(s) unsubstituted or substituted by
di-($C_1$-$C_{16}$alkyl)amino, $C_1$-$C_{16}$alkoxy, nitro, cyano and/or chlorine; and wherein one or more —CH$_2$— group may independently from each other be replaced by a linking group;
$S_1$ and $S_2$ independently from each other denote a spacer unit.

The term "spacer unit" as used in the context of the present invention, is preferably a single bond, a cyclic, straight-chain or branched, substituted or unsubstituted $C_1$-$C_{24}$alkylen, wherein one or more, preferably non-adjacent, —CH$_2$— groups may independently from each other be replaced by a linking group,
wherein linking group, as used in the context of the present invention is preferably be
selected from —O—, —CO, —CO—O—, —O—CO—,

—NR$^1$—, —NR$^1$—CO—, —CO—NR$^1$—, —NR$^1$—CO—O—, —O—CO—NR$^1$—, —NR$^1$—CO—NR$^1$—, —CH=CH—, —C≡C—, —O—CO—O—, and —Si(CH$_3$)$_2$—O—Si(CH$_3$)$_2$—, and wherein:
R$^1$ represents a hydrogen atom or $C_1$-$C_6$alkyl;
and/or a non-aromatic, aromatic, unsubstituted or substituted carbocyclic or heterocyclic group connected via bridging groups (II), and is more preferably the linking group is selected from —O—, —CO—, —CO—O—, —O—CO—; wherein.
bridging group (II) as used in the context of the present invention is preferably selected from —CH(OH)—, —CO—, —CH$_2$(CO)—, —SO—, —CH$_2$(SO)—, —SO$_2$—, —CH$_2$(SO$_2$)—, —COO—, —OCO—, —COCF$_2$—, —CF$_2$CO—, —S—CO—, —CO—S—, —SOO—, —OSO—, —SOS—, —O—CO—O—, —CH$_2$—CH$_2$—, —OCH$_2$—, —CH$_2$O—, —CH=CH—, —C≡C—, —CH=CH—COO—, —OCO—CH=CH—, —CH=N—, —C(CH$_3$)=N—, —N=N— or a single bond; or a cyclic, straight-chain or branched, substituted or unsubstituted $C_1$-$C_{24}$alkylen, wherein one or more —CH$_2$— groups may independently from each other be replaced by a linking group as described above,
with the proviso that oxygen atoms of linking groups are not directly linked to each other.

More preferably $S_1$ and $S_2$ are independently from each other —CO—O—, —O—CO— or —O—, and most preferably $S_1$ is —O— and $S_2$ is —CO—O— or —O—CO—.

Preferably B is a straight-chain or branched $C_1$-$C_{12}$alkyl, wherein one or more, preferably non-adjacent, —CH$_2$— group(s) may independently from each other be replaced by a group selected from —O—, —CO, —CO—O—, —O—CO—, —NR$^1$—, —NR$^1$—CO—, —CO—NR$^1$—, —NR$^1$—CO—O—, —O—CO—NR$^1$—, —NR$^1$—CO—NR$^1$—, —CH=CH—, —C≡C—, —O—CO—O—, and —Si(CH$_3$)$_2$—O—Si(CH$_3$)$_2$—, an aromatic and an alicyclic group; and wherein:
R$^1$ represents a hydrogen atom or $C_1$-$C_6$alkyl;
with the proviso that oxygen atoms are not directly linked to each other.

More preferably, B is a straight-chain or branched $C_1$-$C_{12}$alkyl, wherein one or more, preferably non-adjacent, —CH$_2$— group(s) may be replaced by a group selected from from —O—, —CO, —CO—O—, —O—CO—, —NR$^1$—, —NR$^1$—CO—, —CO—NR$^1$— or —CH=CH— wherein:
R$^1$ represents a hydrogen atom or $C_1$-$C_6$alkyl;
with the proviso that oxygen atoms are not directly linked to each other.

Most preferably, B is a straight-chain or branched $C_1$-$C_8$alkyl, wherein one or more, preferably non-adjacent, —CH$_2$— group(s) may be replaced by a group selected from from —O—, —CO, —CO—O—, —O—CO—, —NR$^1$—, —NR$^1$—CO—, —CO—NR$^1$— or —CH=CH— wherein:
R$^1$ represents a hydrogen atom or $C_1$-$C_6$alkyl;
with the proviso that oxygen atoms are not directly linked to each other.

Especially most preferably, B is a straight-chain or branched $C_1$-$C_8$alkyl, wherein one or more, preferably non-adjacent, the —CH$_2$— group may be replaced by a group selected from —O—, —CO—, —CO—O—, —O—CO—, and —CH=CH—, with the proviso that oxygen atoms are not directly linked to each other.

And further more preferred photoreactive compound (I) comprises photoalignment groups, which are, radicals of coumarine, quinolone, cyanostilbene,
especially such as cyanostilbene of formulae:

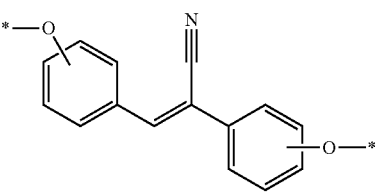

or

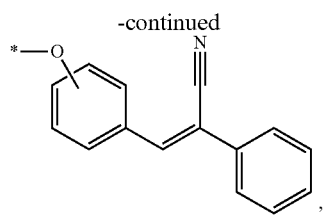

whereby the aromatic rings are unsubstituted or substituted.

Preferred substituents of the photoalignment groups are substituted or unsubstituted $C_1$-$C_{24}$alkyl, preferably $C_1$-$C_{10}$alkyl residue, more preferably $C_1$-$C_8$ alkyl residue, which is unsubstituted, mono-substituted by cyano or halogeno, or poly-substituted by halogeno, wherein one or more non adjacent $CH_2$ groups may independently be replaced by a group Q, wherein Q represents —O—, —CO—, —CO—O—, —O—CO—, —Si($CH_3$)$_2$—O—Si($CH_3$)$_2$—, —$NR^2$—, —$NR^2$—CO—, —CO—$NR^2$—, —$NR^2$—CO—O—, —O—CO—$NR^2$—, —$NR^2$—CO—$NR^2$—, —CH=CH—, —C≡C—, —O—CO—O—, preferably Q represents —O—, —CO—, —CO—O—; and wherein $R^2$ represents hydrogen or $C_1$-$C_6$alkyl; with the proviso that oxygen atoms of linking groups are not directly linked to each other.

In addition preferred photoreactive compounds (I) are herewith incorporated by reference:

alpha, beta-unsaturated-carbonyl, especially cinnamic acid derivatives as described in U.S. Pat. No. 6,610,462, B1, US Re 36,625, EP 0 763 552 B1(GB), U.S. Pat. Nos. 5,965,761, 6,277,502 B1, U.S. Pat. No. 6,632,909 B2, U.S. Pat. Nos. 6,107,427, 5,539,074, WO 00/59966, WO99/15576WO 01/07495, WO 01/53384 A1, WO 2006/039824 A1, WO2007/071091, WO2008/135131; WO02008/145225; Macromolecules, 14, 95 (1981)

coumarine and Quinolone derivatives as described in U.S. Pat. No. 6,201,087 B1, J. SID, 5/4, 367 (1997), Nature, 351, 212 (1996)

cyanostilbene derivatives as described in WO07/033506

Chalcone derivatives as described in J. Photopolym. Sci. Technol., 11, 187 (1998)

Diphenylacetylene derivatives as described in Chem. Mat., 11, 1293 (1999)

Benzylidenephtalimidine derivatives as described in Macromol. Chem. Phys., 199, 375 (1998)

Benzylideneacetophenone derivatives as described in Macromol. Chem. Phys., 199, 363 (1998)

Phenylenediacryloyl derivatives as described in Japan. J. Appl. Phys., 1, 37, 2620 (1998)

Stilbazole derivatives as described in J. Photopolym. Sci. Technol., 12, 279 (1999)

Azo derivatives as described in Chemical Reviews, 100, 1847 (2000)

Polyimides, which photo-degradate by use of linear polarized UV light as described in Appl. Phys. Lett, 72, 1832-1833 (1998).

In the context of the present invention the unreactive additives relate for example to antioxidants, accelerators, dyes, inhibitors, activators, fillers, pigments, anti-static agents, flame-retardant agents; stabilizing additives, such as curing inhibitors, or retardants, such as for example hydroquinone; p-tert.-butyl catechol; 2,6-di tert.-butyl-p-methyl-phenol; phenothiazine; N-phenyl-2-naphthylamine; thickeners, thixotropic agents, surface-active agents, viscosity modifiers, extending oils, plasticizers, tackifiers, catalysts, sensitizers, stabilizers, such as e.g. phenol derivatives, such as 4-ethoxyphenol or 2,6-di-tert-butyl-4-methylphenol (BHT), lubricating agents; dispersing agents, hydrophobing agents, adhesive agents, flow improvers, initiator, especially thermal or photo initiator, defoaming agents, deaerators, diluents, curing inhibitors, auxiliaries, colorants, dyes, pigments or a photo-orientable monomer or oligomer or polymer as described in EP 1 090 325 B. Promoters or accelerators such as metal salts and amines may be used with the initiators.

Reactive additives denote a polymerizable reactive additive. Further, reactive additives are for example selected from the below listed group of additives, which carry at least one polymerizable group: cross-linker such as described in EP 0 331 233, WO 95/24454, U.S. Pat. Nos. 5,567,349, 5,650,534, WO 00/04110, WO 00/07975, WO 00/48985, WO 00/55110 and WO 00/63154, which are herewith incorporated; diluent, liquid crystal, accelerators, dyes, inhibitors, activators, fillers, chain transfer inhibitor, pigments, anti-static agents, flame-retardant agents, thickeners, thixotropic agents, surface-active agents, viscosity modifiers, extending oils, plasticizers, tackifiers, catalyst, sensitizers, stabilizers, lubricating agents; dispersing agents, hydrophobing agents, adhesive agents, flow improvers, defoaming agents, deaerators, diluents, auxiliaries, colorants, dyes and pigments.

The composition is solid, or diluted in a solvent, which is an organic solvent and/or water, as a solution, gel, dispersion or emulsion.

Preferably, the composition is a clear solution. The solvent or solvent mixture used in the present application may be any compound that can dissolve the composition (VI) according to the invention. At least one solvent such as a common polar solvent or a nonpolar solvent may be used. The solvents which are particularly preferred are those leading to a good coatability or printability of the solution of the material to the substrate to be coated.

Non-polar solvents are compounds that have low dielectric constants and are not miscible with water, such as for example hexane, benzene, toluene, diethyl ether, chloroform, ethyl acetate, dichloromethane. Polar solvents are aprotic or protic. Polar aprotic solvents are solvents that share ion dissolving power with protic solvents but lack acidic hydrogen. These solvents generally have high dielectric constants and high polarity. Examples are 1,4-dioxane, tetrahydrofuran (THF), acetone, acetonitrile (MeCN), dimethylformamide (DMF), dimethyl sulfoxide (DMSO), N-methylpyrrolidone (NMP), ethylpyrrolidone, N-vinylpyrrolidone, 2-butoxyethanol (BC), gamma.-butyrolactone (BL), N-methylmorpholine, gamma.-butyrolactone, acetonitrile, ethylcarbitol, butylcarbitol, ethylcarbitol acetate, ethylene glycol, propylene glycol monoacetate, propylene glycol diacetate, dipropylene glycol, and dipropylene glycol monomethyl ether, chlorobenzene, tetrahydrofuran, butyl-cellosolve, cyclopentanone (CP), methylethylketone (MEK), ethyl acetate (EA), anisole (AN), cyclohexanone (CHN), methyl isobutyl ketone (MIBK), 1-methoxy-2-propanol acetate (MPA), N,N-dimethyl-formamide (DMF), dichloromethane, gammrna-butyrolactone (BL), and mixtures thereof. Polar protic solvents are solvents, which contain dissociable H+, such as hydrogen fluoride. The molecules of such solvents can donate an H+(proton). Conversely, aprotic solvents cannot donate hydrogen bonds. Common characteristics of protic solvents are to display hydrogen bonding, to have an acidic hydrogen (although they may be very weak acids), to be able to stabilize ions (cations by unshared free electron pairs, anions by hydrogen bonding). Examples are acetic acid, n-butanol, isopropanol, n-propanol, ethanol, methanol, formic acid and water.

Preferably the organic solvents used in the present application are protic or aprotic polar or non-polar solvents.

Preferred solvents are, however not limited to:
- ketones such as for example acetone, cyclopentanone (CP), cyclohexanone (CH), methyl isobutyl ketone (MIBK), methylethylketone (MEK),
- amides such as N,N-dimethylformamide (DMF), N-methylpyrrolidone (NMP), N-ethylpyrrolidone, N-vinylpyrrolidone, N,N-dimethylacetamide,
- carbamates
- ether such as anisole (AN), tetrahydrofuran (THF), ethylene glycol, dipropylene glycol, butylcarbitol, ethylcarbitol acetate, dipropylene glycol monomethyl ether,
- ester such as ethyl acetate (EA), 1-methoxy-2-propanol acetate (MPA), gamma-butyrolactone (BL), propylene glycol monoacetate, propylene glycol diacetate, dipropylene glycol monomethyl ether,
- alcohols, such as 2-butoxyethanol (BC), ethylcellosolve, butylcellosolve,
- dimethyl sulfoxide (DMSO),
- halogen hydrocarbons such as dichloromethane, chlorobenzene,
- apolar solvents as for example, however not limited to hydrocarbons, such as hexane, heptane, toluene; petrolether.

and mixtures thereof.

More preferred solvents are acetone, cyclopentanone (CP), cyclohexanone (CH), methyl isobutyl ketone (MIBK), methylethylketone (MEK), N,N-dimethylformamide (DMF), N-methylpyrrolidone (NMP), N-ethylpyrrolidone, N-vinylpyrrolidone, N,N-dimethylacetamide, (AN), tetrahydrofuran (THF), ethylene glycol, dipropylene glycol, butylcarbitol, ethylcarbitol acetate, dipropylene glycol monomethyl ether, ethyl acetate (EA), 1-methoxy-2-propanol acetate (MPA), gamma-butyrolactone (BL), butylcellosolve (BC), dichloromethane, propylene glycol monoacetate, propylene glycol diacetate, dipropylene glycol monomethyl ether, anisole (AN), N,N-dimethylformamide (DMF), dimethyl sulfoxide (DMSO) and mixtures thereof.

Most preferred are cyclopentanone (CP), cyclohexanone (CH), methyl isobutyl ketone (MIBK), methylethylketone (MEK), ethyl acetate (EA), 1-methoxy-2-propanol acetate (MPA), dimethyl sulfoxide (DMSO), anisole (AN), N,N-dimethylformamide (DMF), dichloromethane, gamma-butyrolactone (BL), N-methylpyrrolidone (NMP), butylcellosolve (BC) and mixtures thereof.

The amount of the reactive or non reactive additives in the composition is determined according to the wished performances in respect of orientation capability of the photoalignment layer and of its mechanical and thermal stability, as well as of its optical and electrooptical performances. Preferably, the reactive or non reactive additives have an amount of 0.1 to 50% by weight of the composition, preferably an amount of 1 to 30% by weight, even more preferably an amount of 1 to 10% by weight.

In case the compositions of the invention comprise a stabilizer, the latter is generally present in an amount of 0.01 to 5% by weight of the composition, preferably in an amount of 0.1 to 1% by weight.

The solvent is used to aid the coating of the composition. Typical concentrations of the composition disposed in a solvent are between 1 and 50%, preferred between 1 and 10% by weight of the active ingredients in said solvent(s).

In a preferred embodiment of the present invention the photoalignment composition is phase separated having the at least one photoreactive compound (I) in the upper part of the composition.

In a further embodiment the present invention concerns the use of a composition according to the present invention for the preparation of photoalignment material, preferably for a photoalignment layer.

The present invention relates also to photoalignment materials comprising a composition according to the present invention, and preferably a phase-separated composition of the present invention.

The compounds of the invention may be readily prepared using methods that are well known to the person skilled in the art, such as those documented in Houben-Weyl, Methoden der Organischen Chemie, Thieme-Verlag, Stuttgart.

The present invention also relates to a process for the preparation of photoalignment material, preferably photoalignment layer, comprising
a) applying a composition, wherein said composition has the same meaning and preferences as given above; and then
b) optionally drying, and then
c) irradiating the applied composition (VII), obtained after step a) or step b), with aligning light to induce the anisotropy.

The applied composition (VII) is preferably a film.

In general, for the polymerization, the active ingredients are firstly prepared separately from the individual components that are blended.

In general the material for the alignment layer is applied by general coating and printing methods known in the art. Non limiting examples of methods for the patterned deposition of the alignment layer include any coating and printing process involve the application of a thin film of the functional material to a substrate, but are not limited to: spin-coating, blade coating, knife coating, kiss roll coating, cast coating, slot-orifice coating, calendar coating, electrodepositing coating, die coating, dipping, brushing, casting with a bar, roller-coating, flow-coating, injection-molding, wire-coating, spray-coating, dip-coating, whirler-coating, cascade-coating, curtain-coating, air knife coating, gap coating, rotary screen, reverse roll coating, gravure coating, metering rod (Meyer bar) coating, slot die (Extrusion) coating, hot melt coating, roller coating, flexo coating, silk screen coater, relief printing such as flexographic printing, ink jet printing, intaglio printing such as direct gravure printing or offset gravure printing, lithographic printing such as offset printing, or stencil printing such as screen printing.

The substrate is in general glass or plastic, which is optionally coated with indium tin oxide (ITO).

The layer thickness of the composition on the substrate is preferably higher than 5 nm, more preferably between 10 and 800 nm, most preferably between 20 and 100 nm.

It depends on the consistence of the composition whether a drying step is conducted.

If solvents are comprised by the composition, the composition is usually dried after the applying step.

In general "drying" consists in the extraction of the solvent(s) for example by application of heated gas using for example an air stream that applies the heat by convection and carries away the vapor of solvents (convective or direct drying). Drying is faster at higher temperatures. Product or film qualities also have to be considered in the determination of the temperature applied for the drying. Other possibilities are vacuum drying, where heat is supplied by contact conduction or radiation (or microwaves) while the produced vapor is removed by the vacuum system; indirect or contact drying (heating through a hot wall), as drum drying, vacuum drying; dielectric drying (radiofrequency or microwaves being absorbed inside the material); freeze drying or lyophilization; mechanical extraction of the solvent.

The term "aligning light" is light of wavelengths, which can induce anisotropy in the photoalignment layer. Preferably, the wavelengths are in the UV-A, UVB and/or UV/C-range, or in the visible range. It depends on the photoalignment compound, which wavelengths are appropriate. Preferably, the photo-reactive groups are sensitive to visible and/or UV light. The UV light is preferably selected according to the absorption of the photo-reactive groups, i.e. the absorption of the film should overlap with the emission spectrum of the lamp used for the LP-UV irradiation, more preferably with linearly polarized UV light. The intensity and the energy used are chosen depending on the photosensitivity of the material and on the orientation performances which are targeted. In most of the cases, very low energies (few mJ/cm2) already lead to high orientation quality.

More preferably, "aligning light" is at least partially linearly polarized, elliptically polarized, such as for example circularly polarized, or non-polarized, most preferably circularly polarized, or non-polarized light exposed obliquely, or at least partially linearly polarized light. Especially, most preferred aligning light denotes substantially polarised light, especially linearly polarised light; or aligning light denotes non-polarised light, which is applied by an oblique irradiation.

More preferably, the aligning light is UV light, preferably linearly polarized UV light.

Preferably, the present invention relates to a process for the preparation of photoalignment material, preferably photoalignment layer, comprising
a) applying a composition, wherein said composition has the same meaning and preferences as given above; and then
b) optionally drying, and then
c) irradiating the applied composition (VII), obtained after step a) or step b), with aligning light to induce the anisotropy, whereby the composition of step a) or the applied composition (VII) have a vertically phase separated morphology, and whereby the photoreactive compound (I) is preferably located at the film/liquid crystal interface or interphase.

More preferably the concentration of photoreactive compound (I) is 10 times higher in the upper part than in the lower part.

Further more preferred is a process, wherein the composition of step a) comprises a photoreactive compound (I) and a compound (II) that phase separate.

Further more preferred is a process, wherein the photoalignment layer thickness is below 300 nm, most preferred below 150 nm.

The present invention also relates to a photoalignment material for the orientation of liquid crystals especially for LCDs or thin films.

In the context of the present invention the photoalignment material is a layer, preferably in form of a network.

The present invention also relates to a photoalignment material, preferably an unstructured or structured photoalignment material, obtainable by the processes as described above.

The term "structured" refers to a variation in the orientation of the photoalignment material, which is induced by locally varying the direction of the polarized aligning light.

The term "structured" refers to a two dimensional structured layer in the plane, or a three dimensional structured layer in the space, whereby the pattern is periodic or non-periodic. The methods of patterning as described in WO2008/077261 and are herewith incorporated by reference.

Three dimensional forms are for example specific surface relief structures such as inclined or curved liquid crystal polymer structures like e.g. micro-lens or micro-prism structures.

More preferred the wording "patterned layer" denotes birefringence patterned layer and/or thickness patterned layer and/or patterned layer having a patterned optical axis orientation, and/or patterned degree of polymerization.

Accordingly the term "patterning" denotes the process step of preparation the patterned layer.

Birefringence denotes the difference between the extra-ordinary and the ordinary index of refraction.

The local degree of polymerization is quantifiable by a measurement of the local ratio of the unreacted polymerizable groups in the liquid crystal composition after the polymerization.

In addition, the present invention relates to the use of the photoalignment material as a photalignment layer, for aligning organic or inorganic compounds, especially for aligning liquid crystals or liquid crystal polymers.

The present invention also relates to the use of the photoalignment material of the invention in the manufacture of optical or electro-optical component and systems, especially multilayer systems, or devices for the preparation of a display waveguide, a security or brand protection element, for example for banknotes, credit cards, luxury articles, passports, and the like; a bar code, an optical grating, a filter, a retarder, a compensation film, a reflectively polarizing film, an absorptive polarizing film, an anisotropically scattering film compensator and retardation film, a twisted retarder film, a cholesteric liquid crystal film, a liquid crystal display, a guest-host liquid crystal film, a monomer corrugated film, a smectic liquid crystal film, a polarizer, a piezoelectric cell, a thin film exhibiting non linear optical properties, a decorative optical element, a brightness enhancement film, a component for wavelength-band-selective compensation, a component for multi-domain compensation, a component of multiview liquid crystal displays, an achromatic retarder, a polarization state correction/adjustment film, a component of optical or electro-optical sensors, a component of brightness enhancement film, a component for light-based telecommunication devices, a G/H-polarizer with an anisotropic absorber, a reflective circular polarizer, a reflective linear polarizer, a MC (monomer corrugated film), twisted nematic (TN) liquid crystal displays, hybrid aligned nematic (HAN) liquid crystal displays, electrically controlled birefringence (ECB) liquid crystal displays, supertwisted nematic (STN) liquid crystal displays, optically compensated birefringence (OCB) liquid crystal displays, pi-cell liquid crystal displays, in-plane switching (IPS) liquid crystal displays, fringe field switching (FFS) liquid crystal displays, vertically aligned (VA) liquid crystal displays, multidomain vertically aligned (MVA) liquid crystal displays; all above display types are applied in either transmissive or reflective or transflective mode.

The optical or electro-optical component and systems, especially multilayer systems and devices can be patterned or unpatterned.

The term patterning preferably denotes to birefringence patterning and/or thickness patterning and/or patterning of the optical axis orientation, and/or patterning of the degree of polymerization. Birefringence denotes the difference between the extra-ordinary and the ordinary index of refraction.

Thus the invention further relates to an optical or electro-optical elements, systems and devices device comprising photoalignment material, within the above given meaning and preferences.

Preferred are optical or electro-optical elements, systems and devices comprising photoalignment layer and at least one orientable layer, such as a liquid crystal layer or liquid crystal polymer layer.

An optical component, system or device creates, manipulates, or measures electromagnetic radiation.

An electro-optical component, system or device operates by modification of the optical properties of a material by an electric field. Thus it concerns the interaction between the electromagnetic (optical) and the electrical (electronic) states of materials.

The photoalignment material has the ability to align compounds, such as for example nematic liquid crystals, with their long axis along a preferred direction.

The present invention also relates to the use of the photoalignment material, preferably in cross-linked form, as a photalignment layer, for aligning organic or inorganic compounds, especially for aligning liquid crystals.

The term "anisotropy" or "anisotropic" refers to the property of being directionally dependent. Something which is anisotropic may appear different or have different characteristics in different directions.

Preferred is the use for the induction of planar alignment, tilted or vertical alignment of adjacent liquid crystalline layers; more preferred is the use for the induction of planar alignment or vertical alignment in adjacent liquid crystalline layers.

Most preferred is the use of the photoalignment material for adjusting a tilt angle of liquid crystals.

The gist of the present invention lies in the utilization of the thiol, preferably polythiol of formula (V) for the networks. The inventors have found that by the adjunction of monomers bearing thiol moieties, exceptionally high photosensitivities and alignment performances could be achieved. This fact vastly facilitates the manufacture of the networks and alignment layers sought using much reduced energy in comparison to former processes. Moreover, the orientation properties of the alignment layers are considerably improved in comparison with similar, known alignment layers prepared from low molecular weight photo-crosslinkable materials as described in U.S. Pat. No. 6,610,462 B1. Furthermore, very high concentrations of initiator (10-20 weight % of Irgacure 369) were required for the preparation of the photoaligned film which might lead to undesirable effects on the LC alignment quality and/or on the LCD performances.

The inventors were able to synthesize a broad range of different photo-crosslinkable materials of different molecular weights having various absorption properties which offer the possibility to better fit the absorption characteristics of these materials to the emission spectrum of the applied aligned light.

The characteristics of the resulting polymer or network can be targeted to desired performances by controlling the thermal and photo-curing process.

In addition, the blends of the invention give access to very good voltage holding ratios, which is important for LCD applications. For large scale production, the blends comprising only low amounts of the more expensive photoalignment component the blends give access to more economic photoaligning material.

EXAMPLES

Definitions Used in the Examples
Photo Reactive Polymer 1:

prepared as described in WO07/071,091 examples 9 and 18 (polyamic acid 18 and polyimide 18)

Polymer 2:

Polymer 2 is prepared in analogy to methods known in the art such as for example Polymerisation step: Formation of the polyamic acid 6 g (30.26 mmol) of 4,4'-diaminodiphenyl derivative (4,4'-diaminodiphenyl methane, 4,4'-diaminodiphenyl thio-ether, 4,4'-diaminodiphenyl ether, 4,4'-diaminodiphenyl glutaric ester) was solubilised in 71 mL of 1-methyl-2-pyrrolidone (NMP). The mixture was cooled to 0.degree. C. for 10 minutes. 6.648 g (29.66 mmol) of 2,3,5-tricarboxycyclopentylacetic-1,2:3,4-dianhydride were added to the solution. The mixture was stirred at 0.degree. C. for two hours and then at rt for 3 hours. The reaction gave the polyamic acid precursor having a viscosity of 0.4 dL/g.

Polymer 3:

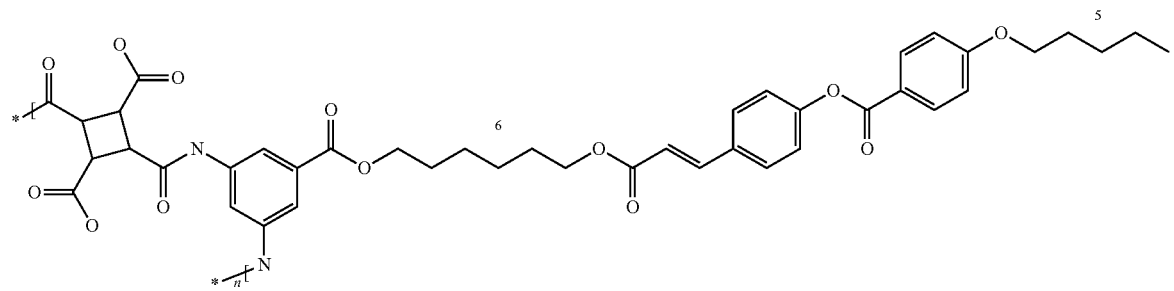 [SMILES: *Nc1cc(NC(=O)C2C(C(=O)O)C(C(*)=O)C2C(=O)O)cc(C(=O)OCCCCCCOC(=O)/C=C/c2ccc(OC(=O)c3ccc(OCCCCC)cc3)cc2)c1]

prepared as described in WO07/071,091 examples 9 and 18 (polyamic acid and 18 polymide 18)

Polymer 4:

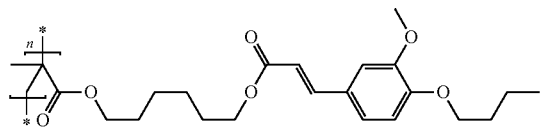

Prepared as described in analogy to U.S. Pat. No. 6,632,909

Polymer 5:

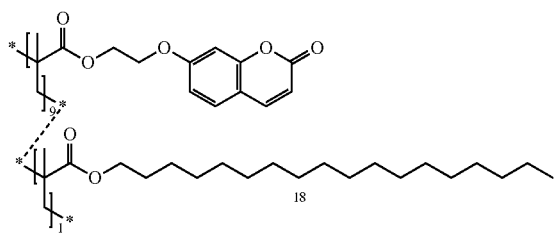

Prepared as described in analogy to WO96/10049

Prepared as described in analogy to U.S. Pat. No. 6,107,427

Liquid Crystal Polymer 1: Composition A in anisol (1:20)

Composition A: the composition comprises,

LCP1 (see below given structure),

LCP2 (see below given structure),

Tinuvin 123 (manufactured by Ciba Speciality Chemicals),

Irgacure 369 (manufactured by Ciba Speciality Chemicals), butyl-hydroxy-toluol having the following ratios (78.43:18.63:0.98:0.98:0.98)

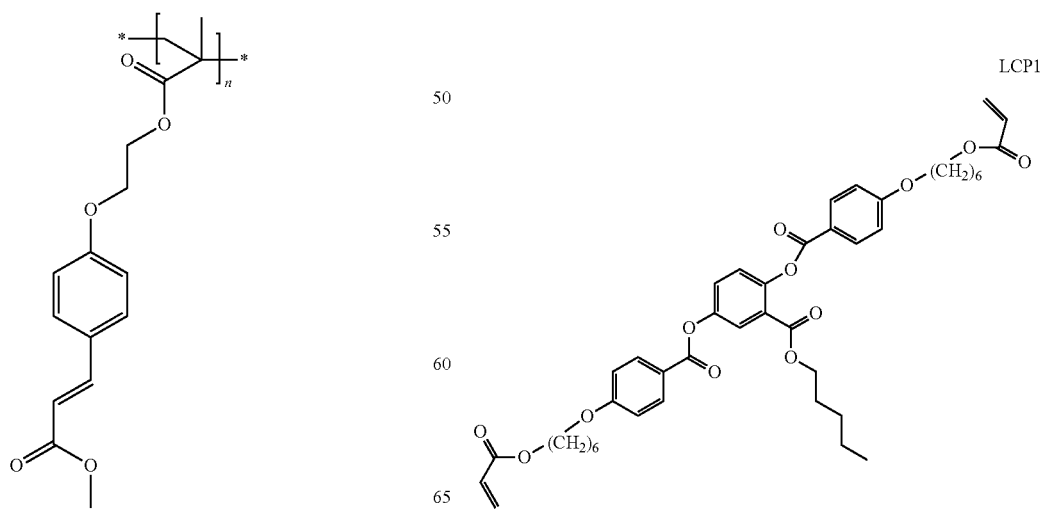

LCP1

Prepared as described in WO00/39631

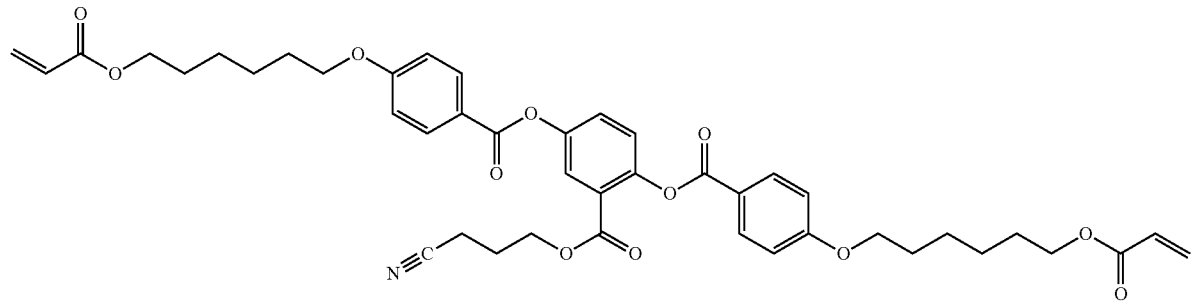

LCP2

Prepared as described in U.S. Pat. No. 6,676,851

Example 1

A liquid crystal cell was prepared wherein the liquid crystal was aligned by photo reactive polymer 1.

A 4% solution of polymer 1 was prepared by mixing the solid polymer 1 in the solvent n-methyl-2-pyrrolidone (NMP) and stirred thoroughly till the solid polymer 1 is dissolved and a second solvent butyl cellulose(BC) is added and the whole composition is stirred thoroughly to obtain final solution. The solvent ratio between n-methyl-2-pyrrolidone and butyl cellulose is 1:1.

The above polymer solution was spin-coated onto the two ITO coated glass substrates at a spin speed of 1600 rpm for 30 seconds.

After spin coating the substrates were subjected to baking procedure consisting of pre-baking for 5 minutes at 130° C. and post-baking for 40 minutes at a temperature of 200° C. The resulting layer thickness was around 60 nm.

The substrates with the coated polymer layer on top were exposed to linearly polarized UV light(LPUV) at an incidence angle of 40° relative to the normal of the substrate surface. The plane of polarization was within the plane spanned by the substrate normal and the propagation direction of the light. The applied exposure dose was 48mJ/cm$^2$.

After LPUV exposure a cell was assembled with the 2 substrates, the exposed polymer layers facing to the inside of the cell. The substrates were adjusted relative to each other such that the induced alignment directions were parallel to each other (corresponds to the anti-parallel rubbed configuration in case of alignment by rubbing procedure). The cell was capillary filled with liquid crystal MLC6610(Merck KGA), which had a negative dielectric anisotropy.

The liquid crystal in the cell showed well defined homeotropic orientation. A tilt angle of 87.7° was measured using the crystal rotation method. Upon applying a voltage of 5V to the electrodes of the cell, the liquid crystal molecules switched from the vertical orientation to a planar orientation, which was observed by arranging the cell between crossed polarizers. The azimuthal orientation direction of the switched liquid crystals was determined to lie in the polarization plane of the LPUV light used for photo-exposure.

Example 2

Another cell was prepared with the same processing and exposure conditions as in Example 1, except that the solution to be coated comprised of polymer 2 instead of polymer 1 and the spin speed used was 2100 rpm for 30 seconds.

Between crossed polarizers the cell appeared bright, independent of the angle between the polarizers and the edges of the substrates of the cell.

Consequently, the liquid crystals were not aligned in vertical direction and there was no preferred azimuthal orientation direction. Because of the missing orientation, a tilt angle could not be determined. However, from the bright appearance of the cell it was concluded that the liquid crystal molecules were oriented almost planar. This interpretation fits with the fact that polymer 2 is a commercial material used as an orientation layer for liquid crystals in twisted nematic LCDs, where typically tilt angles of a few degrees are required.

Example 3

Polymer 1 and polymer 2 were mixed in ratio of 20:80 per weight % to form a blend composition. A 4% solution was prepared as per the procedure explained in Example 1 except that the two polymers were mixed in the solvent at the same time.

A cell was prepared with the same processing and exposure conditions as in Example 1, except that the solution used is a blend composition of polymer 1 and polymer 2 in ratio of 20:80 per weight % and the spin speed used was 1900 rpm for 30 seconds.

The liquid crystal in the cell showed well defined homeotropic orientation. A tilt angle of 87.7° was measured using the crystal rotation method. Upon applying a voltage of 5V to the electrodes of the cell, the liquid crystal molecules switched from the vertical orientation to a planar orientation, which was observed by arranging the cell between crossed polarizers. The azimuthal orientation direction of the switched liquid crystals was determined to lie in the polarization plane of the LPUV light used for photo-exposure.

Example 4

Polymer 1 and polymer 2 were mixed in ratio of 10:90 per weight % to form a blend composition. A 4% solution was prepared as per the procedure explained in Example 1 except that the two polymers were mixed in the solvent at the same time.

A cell was prepared with the same processing and exposure conditions as in Example 1, except that the solution used is a blend composition of polymer 1 and polymer 2 in ratio of 10:90 per weight % and the spin speed used was 2000 rpm for 30 seconds.

The liquid crystal in the cell showed well defined homeotropic orientation. A tilt angle of 87.6° was measured using the crystal rotation method. Upon applying a voltage of 5V to the electrodes of the cell, the liquid crystal molecules switched from the vertical orientation to a planar orientation, which was observed by arranging the cell between crossed polarizers. The azimuthal orientation direction of the switched liquid crystals was determined to lie in the polarization plane of the LPUV light used for photo-exposure.

Example 5

Polymer 1 and polymer 2 were mixed in ratio of 5:95 per weight % to form a blend composition. A 4% solution was prepared as per the procedure explained in Example 1 except that the two polymers were mixed in the solvent at the same time.

A cell was prepared with the same processing and exposure conditions as in Example 1, except that the solution used is a blend composition of polymer 1 and polymer 2 in ratio of 5:95 per weight % and the spin speed used was 2050 rpm for 30 seconds.

The liquid crystal in the cell showed well defined homeotropic orientation. A tilt angle of 87.9° was measured using the crystal rotation method, Upon applying a voltage of 5V to the electrodes of the cell, the liquid crystal molecules switched from the vertical orientation to a planar orientation, which was observed by arranging the cell between crossed polarizers. The azimuthal orientation direction of the switched liquid crystals was determined to lie in the polarization plane of the LPUV light used for photo-exposure.

Example 6

Polymer 1 and polymer 2 were mixed in ratio of 4:96 per weight % to form a blend composition. A 4% solution was prepared as per the procedure explained in Example 1 except that the two polymers were mixed in the solvent at the same time.

A cell was prepared with the same processing and exposure conditions as in Example 1, except that the solution used is a blend composition of polymer 1 and polymer 2 in ratio of 4:96 per weight % and the spin speed used was 2000 rpm for 30 seconds.

The liquid crystal in the cell showed well defined homeotropic orientation. A tilt angle of 87.5° was measured using the crystal rotation method. Upon applying a voltage of 5V to the electrodes of the cell, the liquid crystal molecules switched from the vertical orientation to a planar orientation, which was observed by arranging the cell between crossed polarizers. The azimuthal orientation direction of the switched liquid crystals was determined to lie in the polarization plane of the LPUV light used for photo-exposure.

Example 7

Polymer 1 and polymer 2 were mixed in ratio of 3:97 per weight % to form a blend composition. A 4% solution was prepared as per the procedure explained in Example 1 except that the two polymers were mixed in the solvent at the same time.

A cell was prepared with the same processing and exposure conditions as in Example 1, except that the solution used is a blend composition of polymer 1 and polymer 2 in ratio of 3:97 per weight % and the spin speed used was 2000 rpm for 30 seconds.

The liquid crystal in the cell showed well defined homeotropic orientation. A tilt angle of 87.7° was measured using the crystal rotation method. Upon applying a voltage of 5V to the electrodes of the cell, the liquid crystal molecules switched from the vertical orientation to a planar orientation, which was observed by arranging the cell between crossed polarizers. The azimuthal orientation direction of the switched liquid crystals was determined to lie in the polarization plane of the LPUV light used for photo-exposure.

Example 8

Polymer 1 and polymer 2 were mixed in ratio of 2:98 per weight % to form a blend composition. A 4% solution was prepared as per the procedure explained in Example 1 except that the two polymers were mixed in the solvent at the same time.

A cell was prepared with the same processing and exposure conditions as in Example 1, except that the solution used is a blend composition of polymer 1 and polymer 2 in ratio of 2:98 per weight % and the spin speed used was 2000 rpm for 30 seconds.

A tilt angle of 0.04° was measured using the crystal rotation method. The cell was arranged between crossed polarizers without any voltage applied, with the director of liquid crystal in the cell set at 45° to the axis of crossed polarizers, and the cell has bright appearance which concludes that the liquid crystal molecules were oriented almost planar. The cell was again arranged between crossed polarizers without any voltage applied, with the director of liquid crystal in the cell set at 0° to any one of the transmission axis of the polarizers, the cell has dark appearance, which concludes the well defined azimuthal orientation direction of liquid crystal lying in the polarization plane of the LPUV light used for photo exposure.

Example 9

Polymer 1 and polymer 2 were mixed in ratio of 1:99 per weight % to form a blend composition. A 4% solution was prepared as per the procedure explained in Example 1 except that the two polymers were mixed in the solvent at the same time.

A cell was prepared with the same processing and exposure conditions as in Example 1, except that the solution used is a blend composition of polymer 1 and polymer 2 in ratio of 1:99 per weight % and the spin speed used was 2000 rpm for 30 seconds.

A tilt angle of 0.02° was measured using the crystal rotation method. The cell was arranged between crossed polarizers without any voltage applied, with the director of liquid crystal in the cell set at 45° to the axis of crossed polarizers, and the cell has bright appearance which concludes that the liquid crystal molecules were oriented almost planar. The cell was again arranged between crossed polarizers without any voltage applied, with the director of liquid crystal in the cell set at 0° to any one of the transmission axis of the polarizers, the cell has dark appearance, which concludes the well defined azimuthal orientation direction of liquid crystal lying in the polarization plane of the LPUV light used for photo exposure.

Example 10

Polymer 1 and polymer 2 were mixed in ratio of 0.5:99.5 per weight % to form a blend composition. A 4% solution was prepared as per the procedure explained in Example 1 except that the two polymers were mixed in the solvent at the same time.

A cell was prepared with the same processing and exposure conditions as in Example 1, except that the solution used is a blend composition of polymer 1 and polymer 2 in ratio of 0.5:99.5 per weight % and the spin speed used was 2000 rpm for 30 seconds.

A tilt angle of 0.02° was measured using the crystal rotation method. The cell was arranged between crossed polarizers without any voltage applied, with the director of liquid crystal in the cell set at 45° to the axis of crossed polarizers, and the cell has bright appearance which concludes that the liquid crystal molecules were oriented almost planar. The cell was again arranged between crossed polarizers without any voltage applied, with the director of liquid crystal in the cell set at 0° to any one of the transmission axis of the polarizers, the cell has dark appearance, which concludes the well defined azimuthal orientation direction of liquid crystal lying in the polarization plane of the LPUV light used for photo exposure.

Example 11

Polymer 1 and polymer 2 were mixed in ratio of 0.2:99.8 per weight % to form a blend composition. A 4% solution was prepared as per the procedure explained in Example 1 except that the two polymers were mixed in the solvent at the same time.

A cell was prepared with the same processing and exposure conditions as in Example 1, except that the solution used is a blend composition of polymer 1 and polymer 2 in ratio of 0.2:99.8 per weight % and the spin speed used was 2000 rpm for 30 seconds.

A tilt angle of 0.02° was measured using the crystal rotation method. The cell was arranged between crossed polarizers without any voltage applied, with the director of liquid crystal in the cell set at 45° to the axis of crossed polarizers, and the cell has bright appearance which concludes that the liquid crystal molecules were oriented almost planar. The cell was again arranged between crossed polarizers without any voltage applied, with the director of liquid crystal in the cell set at 0° to any one of the transmission axis of the polarizers, the cell has dark appearance, which concludes the well defined azimuthal orientation direction of liquid crystal lying in the polarization plane of the LPUV light used for photo exposure.

Example 12

Polymer 1 and polymer 2 were mixed in ratio of 0.1:99.9 per weight % to form a blend composition. A 4% solution was prepared as per the procedure explained in Example 1 except that the two polymers were mixed in the solvent at the same time.

A cell was prepared with the same processing and exposure conditions as in Example 1, except that the solution used is a blend composition of polymer 1 and polymer 2 in ratio of 0.1:99.9 per weight % and the spin speed used was 2000 rpm for 30 seconds.

A tilt angle of 0.02° was measured using the crystal rotation method. The cell was arranged between crossed polarizers without any voltage applied, with the director of liquid crystal in the cell set at 45° to the axis of crossed polarizers, and the cell has bright appearance which concludes that the liquid crystal molecules were oriented almost planar. The cell was again arranged between crossed polarizers without any voltage applied, with the director of liquid crystal in the cell set at 0° to any one of the transmission axis of the polarizers, the cell has dark appearance, which concludes the well defined azimuthal orientation direction of liquid crystal lying in the polarization plane of the LPUV light used for photo exposure.

Example 13

A cell was prepared with the same processing and exposure conditions as in Example 1, except that solution used comprises of polymer solution A which is a commercial material OPTMER AL60702(JSR corporation) used as an orientation layer for liquid crystals in vertically aligned LCDs, where high tilt angles are required, and also except that the spin speed used was 3000 rpm for 30 seconds The liquid crystals were oriented in vertical direction. A tilt angle of 90° was measured using the crystal rotation method. Upon applying a voltage of 5V to the electrodes of the cell, the liquid crystal molecules switched from the vertical orientation to a planar orientation, which was observed by arranging the cell between crossed polarizers, but there was no preferred azimnuthal orientation direction.

This material was used in blend composition for further Examples 14, 15, 16 and 17 by replacing the polymer 2 of blend compositions listed in Examples 7, 8, 9 and 10.

Example 14

A blend composition in ratio of 3:97 per weight % was prepared using polymer 1 listed in Example 1 and polymer solution A listed in Example 13 as per the procedure explained in Example 1 except that the solvents used were n-methyl-2-pyrrolidone, butyl cellulose and gamma butyrolactone in ratio of 3:3:4.

A cell was prepared with the same processing and exposure conditions as in Example 1, except that the solution used is a blend composition of polymer 1 listed in Example 1 and polymer solution A listed in Example 13 in ratio of 3:97 per weight % and the spin speed used was 2700 rpm for 30 seconds.

The liquid crystal in the cell showed well defined homeotropic orientation. A tilt angle of 88.00 was measured using the crystal rotation method. Upon applying a voltage of 5V to the electrodes of the cell, the liquid crystal molecules switched from the vertical orientation to a planar orientation, which was observed by arranging the cell between crossed polarizers. The azimuthal orientation direction of the switched liquid crystals was determined to lie in the polarization plane of the LPUV light used for photo-exposure.

Example 15

A blend composition in ratio of 2:98 per weight % was prepared using polymer 1 listed in Example 1 and polymer solution A listed in Example 13 as per the procedure explained in Example 1 except that the solvents used were n-methyl-2-pyrrolidone, butyl cellulose and gamma butyrolactone in ratio of 3:3:3:4.

A cell was prepared with the same processing and exposure conditions as in Example 1, except that the solution used is a blend composition of polymer 1 listed in Example 1 and polymer solution A listed in Example 13 in ratio of 2:98 per weight % and the spin speed used was 2700 rpm for 30 seconds.

The liquid crystal in the cell showed well defined homeotropic orientation. A tilt angle of 88.5° was measured using the crystal rotation method. Upon applying a voltage of 5V to the electrodes of the cell, the liquid crystal molecules switched from the vertical orientation to a planar orientation, which was observed by arranging the cell between crossed polarizers. The azimuthal orientation direction of the switched liquid crystals was determined to lie in the polarization plane of the LPUV light used for photo-exposure.

Example 16

A blend composition in ratio of 1:99 per weight % was prepared using polymer 1 listed in Example 1 and polymer solution A listed in Example 13 as per the procedure explained in Example 1 except that the solvents used were n-methyl-2-pyrrolidone, butyl cellulose and gamma butyrolactone in ratio of 3:3:4.

A cell was prepared with the same processing and exposure conditions as in Example 1, except that the solution used is a blend composition of polymer 1 listed in Example 1 and polymer solution A listed in Example 13 in ratio of 1:99 per weight % and the spin speed used was 2700 rpm for 30 seconds.

The liquid crystal in the cell showed well defined homeotropic orientation. A tilt angle of 89.4° was measured using the crystal rotation method. Upon applying a voltage of 5V to the electrodes of the cell, the liquid crystal molecules switched from the vertical orientation to a planar orientation, which was observed by arranging the cell between crossed polarizers. The azimuthal orientation direction of the switched liquid crystals was determined to lie in the polarization plane of the LPUV light used for photo-exposure.

Example 17

A blend composition in ratio of 0.5:99.5 per weight % was prepared using polymer 1 listed in Example 1 and polymer solution A listed in Example 13 as per the procedure explained in Example 1 except that the solvents used were n-methyl-2-pyrrolidone, butyl cellulose and gamma butyrolactone in ratio of 3:3:4.

A cell was prepared with the same processing and exposure conditions as in Example 1, except that the solution used is a blend composition of polymer 1 listed in Example 1 and polymer solution A listed in Example 13 in ratio of 0.5:99.5 per weight % and the spin speed used was 2700 rpm for 30 seconds.

The liquid crystal in the cell showed well defined homeotropic orientation. A tilt angle of 89.8° was measured using the crystal rotation method. Upon applying a voltage of 5V to the electrodes of the cell, the liquid crystal molecules switched from the vertical orientation to a planar orientation, which was observed by arranging the cell between crossed polarizers. The azimuthal orientation direction of the switched liquid crystals was determined to lie in the polarization plane of the LPUV light used for photo-exposure.

Example 18

A cell was prepared with the same processing and exposure conditions as in Example 1, except that the polymer 3 was used instead of polymer 1 and the spin speed used was 2000 rpm for 30 seconds.

The liquid crystal in the cell showed well defined homeotropic orientation. A tilt angle of 88.7° was measured using the crystal rotation method. Upon applying a voltage of 5V to the electrodes of the cell, the liquid crystal molecules switched from the vertical orientation to a planar orientation, which was observed by arranging the cell between crossed polarizers. The azimuthal orientation direction of the switched liquid crystals was determined to lie in the polarization plane of the LPUV light used for photo-exposure.

Example 19

An experiment was performed with similar combination as in Example 10, except that the polymer 1 is replaced by polymer 3 listed in Example 18.

A cell was prepared with the same processing and exposure conditions as in Example 1, except that the solution used is a blend composition of polymer 3 and polymer 2 in ratio of 0.5:99.5 per weight % and the spin speed used was 2000 rpm for 30 seconds.

A tilt angle of 0.02° was measured using the crystal rotation method. The cell was arranged between crossed polarizers without any voltage applied, with the director of liquid crystal in the cell set at 45° to the axis of crossed polarizers, and the cell has bright appearance which concludes that the liquid crystal molecules were oriented almost planar. The cell was again arranged between crossed polarizers without any voltage applied, with the director of liquid crystal in the cell set at 0° to any one of the transmission axis of the polarizers, the cell has dark appearance, which concludes the well defined azimuthal orientation direction of liquid crystal lying in the polarization plane of the LPUV light used for photo exposure.

Example 20

A cell was prepared with the same processing and exposure conditions as in Example 1, except that the polymer 4 was used instead of polymer 1 and the spin speed used was 2000 rpm for 30 seconds.

The liquid crystal in the cell showed well defined homeotropic orientation. A tilt angle of 89.2° was measured using the crystal rotation method. Upon applying a voltage of 5V to the electrodes of the cell, the liquid crystal molecules switched from the vertical orientation to a planar orientation, which was observed by arranging the cell between crossed polarizers. The azimuthal orientation direction of the switched liquid crystals was determined to lie in the polarization plane of the LPUV light used for photo-exposure.

Example 21

An experiment was performed with similar combination as in Example 10, except that the polymer 1 is replaced by polymer 4 listed in Example 20.

A cell was prepared with the same processing and exposure conditions as in Example 1, except that the solution used is a blend composition of polymer 4 and polymer 2 in ratio of 0.5:99.5 per weight % and the spin speed used was 2000 rpm for 30 seconds.

A tilt angle of 0.04° was measured using the crystal rotation method. The cell was arranged between crossed polarizers without any voltage applied, with the director of liquid crystal in the cell set at 45° to the axis of crossed polarizers, and the cell has bright appearance which concludes that the liquid crystal molecules were oriented almost planar. The cell was again arranged between crossed polarizers without any voltage applied, with the director of liquid crystal in the cell set at 0° to any one of the transmission axis of the polarizers, the cell has dark appearance, which concludes the well defined azimuthal orientation direction of liquid crystal lying in the polarization plane of the LPUV light used for photo exposure.

Example 22

A cell was prepared with the same processing and exposure conditions as in Example 1, except that the polymer 5 was used instead of polymer 1 and the spin speed used was 1300 rpm for 30 seconds.

The liquid crystal in the cell showed well defined homeotropic orientation. A tilt angle of 89.9° was measured using the crystal rotation method. Upon applying a voltage of 5V to the electrodes of the cell, the liquid crystal molecules switched from the vertical orientation to a planar orientation, which was observed by arranging the cell between crossed polarizers. The azimuthal orientation direction of the switched liquid crystals was determined to lie in the polarization plane of the LPUV light used for photo-exposure.

Example 23

An experiment was performed with similar combination as in Example 6, except that the polymer 1 is replaced by polymer 5 listed in Example 22.

A cell was prepared with the same processing and exposure conditions as in Example 1, except that the solution used is a blend composition of polymer 5 and polymer 2 in ratio of 4:96 per weight % and the spin speed used was 2000 rpm for 30 seconds.

A tilt angle of 28° was measured using the crystal rotation method. The cell was arranged between crossed polarizers without any voltage applied, with the director of liquid crystal in the cell set at 45° to the axis of crossed polarizers, and the cell has bright appearance which concludes that the liquid crystal molecules were oriented planar. The cell was again arranged between crossed polarizers without any voltage applied, with the director of liquid crystal in the cell set at 0° to any one of the transmission axis of the polarizers, the cell has dark appearance, which concludes the well defined azimuthal orientation direction of liquid crystal lying in the polarization plane of the LPUV light used for photo exposure.

Example 24

An experiment was performed with similar combination as in Example 9, except that the polymer 1 is replaced by polymer 5 listed in Example 22.

A cell was prepared with the same processing and exposure conditions as in Example 1, except that the solution used is a blend composition of polymer 5 and polymer 2 in ratio of 1:99 per weight % and the spin speed used was 2000 rpm for 30 seconds.

A tilt angle of 0.09° was measured using the crystal rotation method. The cell was arranged between crossed polarizers without any voltage applied, with the director of liquid crystal in the cell set at 45° to the axis of crossed polarizers, and the cell has bright appearance which concludes that the liquid crystal molecules were oriented almost planar. The cell was again arranged between crossed polarizers without any voltage applied, with the director of liquid crystal in the cell set at 0° to any one of the transmission axis of the polarizers, the cell has dark appearance, which concludes the well defined azimuthal orientation direction of liquid crystal lying in the polarization plane of the LPUV light used for photo exposure.

Example 25

An experiment was performed with similar combination as in Example 5, except that the polymer 1 is replaced by polymer 6.

A cell was prepared with the same processing and exposure conditions as in Example 1, except that the solution used is a blend composition of polymer 6 and polymer 2 in ratio of 5:95 per weight % and the spin speed used was 1800 rpm for 30 seconds.

A tilt angle of 0.2° was measured using the crystal rotation method. The cell was arranged between crossed polarizers without any voltage applied, with the director of liquid crystal in the cell set at 45° to the axis of crossed polarizers, and the cell has bright appearance which concludes that the liquid crystal molecules were oriented almost planar. The cell was again arranged between crossed polarizers without any voltage applied, with the director of liquid crystal in the cell set at 0° to any one of the transmission axis of the polarizers, the cell has dark appearance, which concludes the well defined azimuthal orientation direction of liquid crystal lying in the polarization plane of the LPUV light used for photo exposure.

Example 26

From Examples 1 to 25, the anisotropic orientation of liquid crystal in cells were observed. Another experiment was performed where the anisotropic orientation of liquid crystal polymer was observed.

Blend composition listed in Example 11 was used for this experiment. A glass substrate was processed with this above blend composition similar to the processing steps in Example 1, except that only one substrate is used for processing and no liquid crystal is used. This coated substrate was subjected to a second process step by spin coating with liquid crystal polymer 1 at a spin speed of 1200 rpm for a duration of 60 seconds which gives thickness of around 700 nm, then the coated substrate is placed in atmosphere of nitrogen and cross linked with the help of UV A light source at energy dose of 240mJ/cm$^2$.

The above substrate was arranged between crossed polarizers, with the director of liquid crystal polymer set at 45° to the axis of crossed polarizers, and the substrate has bright appearance which concludes that the liquid crystal polymer molecules were oriented almost planar. The substrate was again arranged between crossed polarizers, with the director of liquid crystal polymer set at 0° to any one of the transmission axis of the polarizers, the substrate has dark appearance, which concludes the well defined azimuthal orientation direction of liquid crystal polymer lying in the polarization plane of the LPUV light used for photo exposure.

Example 27

Similar experiment was performed as in Example 25, except that the blend composition listed in Example 12 was used.

Similar observations of orientation as in Example 25 was concluded.

Example 28

A blend 1 was prepared that consisted of 95% by weight of a compound (II) as given in the below table, and 5% by weight of a photoreactive compound (II) as given in the table below. Blend 1 was dissolved to 2% by weight in cyclopentanone and stirred for half an hour at room temperature.

Indium tin oxide (ITO) coated glass plates were used as substrates. By means of spin-coating a solution of blend 1 with a solid content of 2 weight percent in cyclopentanone an alignment layer with a dry thickness of approximately 60 nm was prepared with the spin parameters of 2000 rpm during 60s. The alignment layer was subsequently thermally treated on a hot-plate for 10 minutes at a temperature of 180° C. After that, the photo-alignment layer was vertically exposed to linearly polarised UVB light (wavelengths between 280 and 320 nm). A dose of 150 mJ/cm² was applied at an intensity of 3 mW/cm². In a next step, a 25 weight percent solution in cyclopentanone of the formulation M1 (Example 1) was spin-coated on top of the functionalized photo-alignment layer with the spin parameters of 800 rpm during 60s. A dry film thickness of approximately 800 nm was achieved this way. A thermal treatment at a temperature of 40° C. on a hot-plate was then carried out for a duration of 10 minutes.

1)

Photoreactive compound (II)

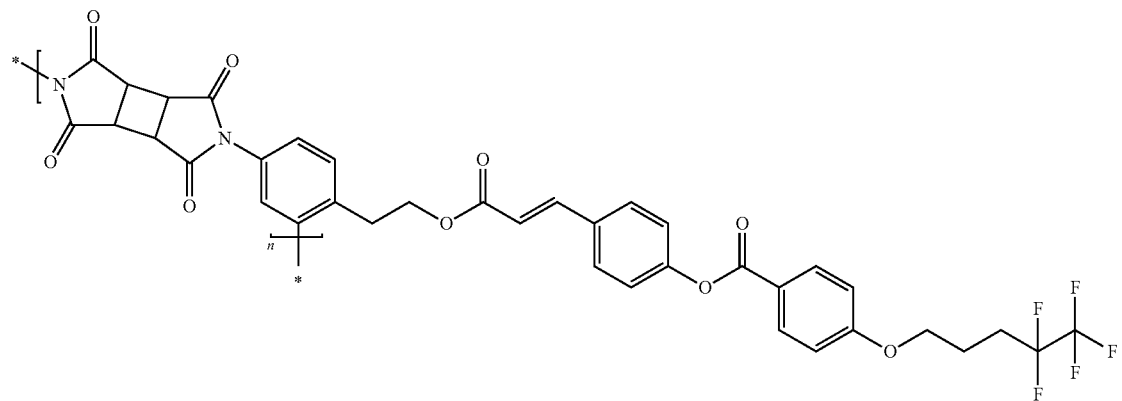

2)

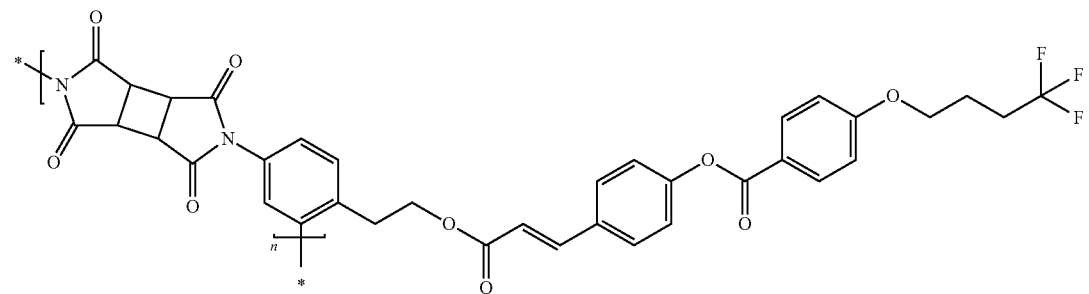

3)

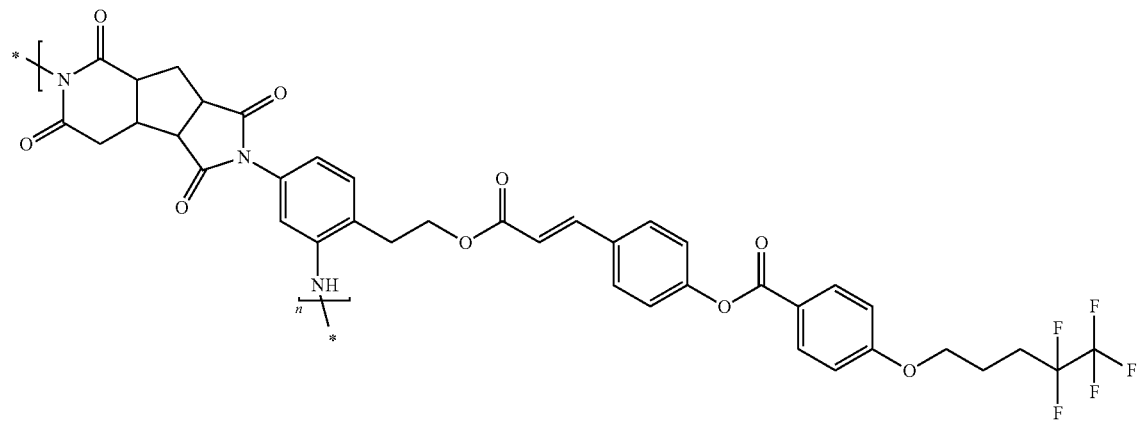

prepared as described in examples 9 and 18 of WO 07/071091 a)
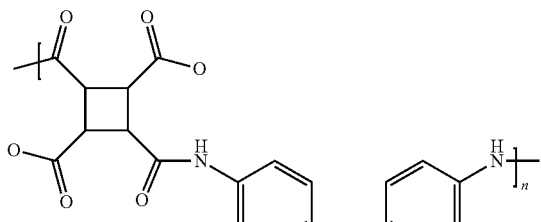

b)
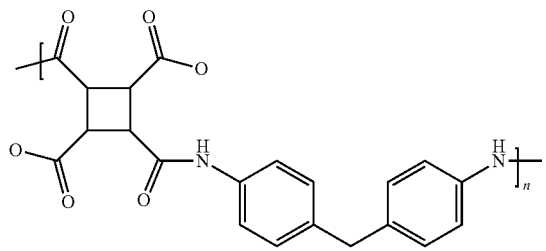

Compound (II)

c)
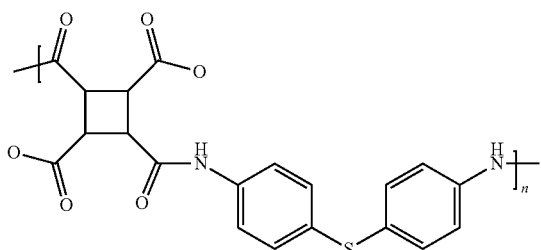

d)
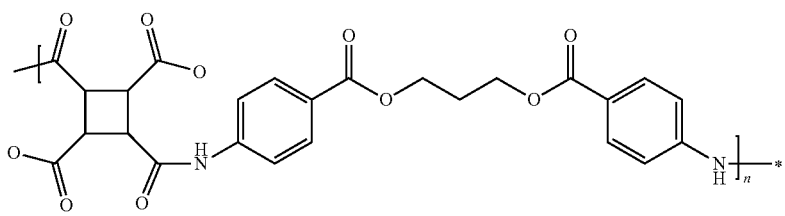

Compounds (II) are prepared in analogy to methods known in the art such as for example Polymerisation step: Formation of the polyamic acid (30.26 mmol) of 4,4'-diaminodipheny derivative (4,4'-diaminodiphenyl methane, 4,4'-diaminodiphenyl thioether, 4,4'-diaminodiphenyl ether, 4,4'-diaminodiphenyl glutaric ester) was solubilised in 71 mL of 1-methyl-2-pyrrolidone (NMP). The mixture was cooled to 0° C. for 10 minutes. (29.66 mmol) of 1, 2,3,4-cyclobutanetretracarboxilic acid dianhydride were added to the solution. The mixture was stirred at 0° C. for two hours and then at rt for 3 hours. The reaction gave the polyamic acid precursor having a viscosity of 0.4 dL/g.

What is claimed is:

1. A structured photoalignment material formed by a process comprising:
   a) applying a composition, wherein said composition comprises:
      i) 0.001 to 20%, by weight, of at least one photoreactive compound (I) that comprises a photoalignment group, which is of formula:

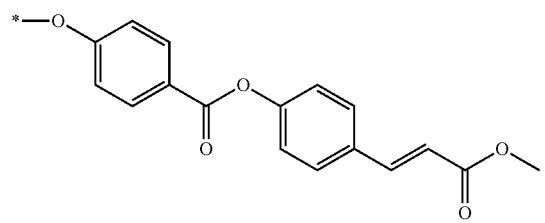 or

-continued

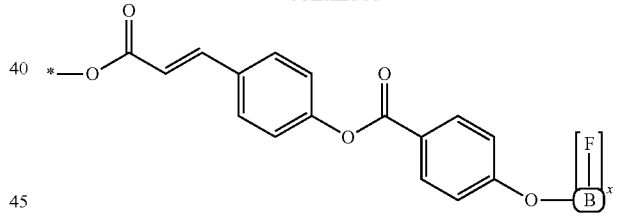

whereby the aromatic rings are unsubstituted or substituted and wherein the compound residue (Ia)

(Ia)

$\left[\begin{array}{c}F\\|\\|\end{array}\right]_x$
$\boxed{B}$ represents a straight-chain or branched $C_1$-$C_{16}$ fluoralkyl group, wherein F is fluorine, and x is an integer from 0, 1, 2, 3, 4, 5, 6, 7, 8 or 9;

B represents a straight-chain or branched $C_1$-$C_{16}$ alkyl group, which is in addition to its fluorine substituent(s) unsubstituted or substituted by di-($C_1$-$C_{16}$ alkyl)amino, $C_1$-$C_6$ alkoxy, nitro, cyano and/or chlorine; and wherein one or more —$CH_2$—group may independently from each other be replaced by a linking group, wherein the linking group is selected from —O—, —CO—, —CO—O—, —O—CO—, —$NR^1$—, —$NR^1$—CO—, —CO—$NR^1$—, —$NR^1$CO—O—, —O—CO—$NR^1$—, —$NR^1$—CO—$NR^1$—, —CH=CH—, —C≡C—, —O—CO—O—, and —Si($CH_3$)$_2$—O—Si($CH_3$)$_2$—, and wherein:

$R^1$ represents a hydrogen atom or $C_1$-$C_6$ alkyl; and ii) 80 to 99.999% by weight, of at least one compound (II) that does not comprise a photoalignment group, wherein the at least one compound (II) is polyamic acid and/or polyimide, and iii) optionally at least one reactive or non reactive additive, and iv) optionally at least one solvent; and then b) optionally drying, wherein step a) and then optionally step b) provides an applied composition (VII), and then c) irradiating the applied composition (VII), obtained after step a) or step b), with aligning polarized light to induce anisotropy;

wherein the structured photoalignment material having polarized light-induced alignment anisotropy, has a patterned variation in the orientation of the photoalignment material, and is a patterned two dimensional structured layer in a plane, or a patterned three dimensional structured layer in space.

2. A patterned optical or electro-optical element, system or device, comprising the structured photoalignment material as claimed in claim 1.

3. A method of using the patterned optical or electro-optical element as claimed in claim 2, comprising preparing a display waveguide, a security or brand protection element, a bar code, an optical grating, a filter, a retarder, a compensation film, a reflectively polarizing film, an absorptive polarizing film, an anisotropically scattering film compensator and retardation film, a twisted retarder film, a liquid crystal display, a cholesteric liquid crystal film, a guest-host liquid crystal film, a monomer corrugated film, a smectic liquid crystal film, a polarizer, a piezoelectric cell, a thin film exhibiting non linear optical properties, a decorative optical element, a brightness enhancement film, a component for wavelength-band- selective compensation, a component for multi-domain compensation, a component of multiview liquid crystal displays, an achromatic retarder, a polarization state correction/adjustment film, a component of optical or electro-optical sensors, a component of brightness enhancement film, a component for light-based telecommunication devices, a G/H-polarizer with an anisotropic absorber, a reflective circular polarizer, a reflective linear polarizer, a MC (monomer corrugated film), twisted nematic (TN) liquid crystal displays, hybrid aligned nematic (HAN) liquid crystal displays, electrically controlled birefringence (ECB) liquid crystal displays, supertwisted nematic (STN) liquid crystal displays, optically compensated birefringence (OCB) liquid crystal displays, pi-cell liquid crystal displays, in-plane switching (IPS) liquid crystal displays, fringe field switching (FFS) liquid crystal displays, vertically aligned (VA) liquid crystal displays, or multi domain vertically aligned (MVA) liquid crystal displays with the patterned optical or electro-optical element; wherein all of the displays are applied in either transmissive or reflective or transflective mode.

4. A method of using the structured photoalignment material as claimed in claim 1, comprising providing the structured photoalignment material as a structured photoalignment layer, for aligning organic or inorganic compounds.

5. A process for the preparation of the structured photoalignment material as claimed in claim 1, comprising the steps of a) applying the composition, and then b) optionally drying, and then c) irradiating the applied composition (VII), obtained after step a) or step b), with the aligning polarized light to induce the anistropy.

6. A structured photoalignment material formed from a layer of a composition which comprises:

i) 0.001 to 20%, by weight, of at least one photoreactive compound (I) that comprises a photoalignment group, which is of formula:

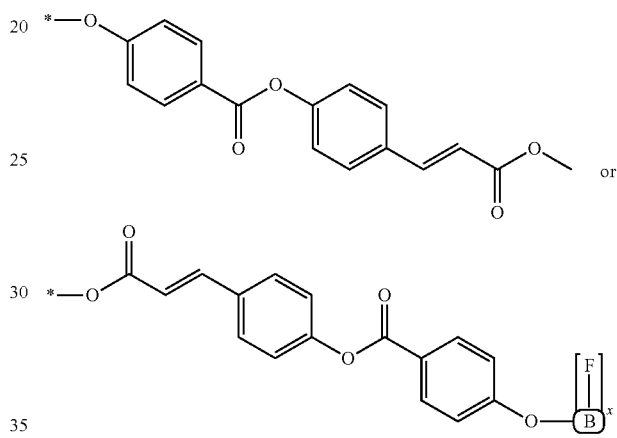

whereby the aromatic rings are unsubstituted or substituted and wherein the compound residue (Ia)

(Ia)

represents a straight-chain or branched $C_1$-$C_{16}$ fluoralkyl group, wherein F is fluorine, and x is an integer from 0, 1, 2, 3, 4, 5, 6, 7, 8 or 9;

B represents a straight-chain or branched $C_1$-$C_{16}$alkyl group, which is in addition to its fluorine substituent(s) unsubstituted or substituted by di-($C_1$-$C_{16}$ alkyl)amino, $C_1$-$C_6$ alkoxy, nitro, cyano and/or chlorine; and wherein one or more —$CH_2$—group may independently from each other be replaced by a linking group, wherein the linking group is selected from —O—, —CO—, —CO—O—, —O—CO—, —$NR^1$—, —$NR^1$—CO—, —CO—$NR^1$—, —$NR^1$CO—O—, —O—CO—$NR^1$—, —$NR^1$—CO—$NR^1$—, —CH=CH—, —C≡C—, —O—CO—O—, and —Si($CH_3$)$_2$—O—Si($CH_3$)$_2$—, and wherein:

R¹ represents a hydrogen atom or $C_1$-$C_6$ alkyl; and ii) 80 to 99.999% by weight, of at least one compound (II) that does not comprise a photoalignment group, wherein the at least one compound (II) is polyamic acid and/or polyimide, and iii) optionally at least one reactive or non reactive additive, and iv) optionally at least one solvent;

wherein the structured photoalignment material has polarized light-induced alignment anisotropy with a patterned variation in the orientation of the photoalignment material, and is a patterned two dimensional structured layer in a plane, or a patterned three dimensional structured layer in space.

7. A method of using a photoalignment material, comprising preparing a patterned optical or electro optical component and system, multilayer system, or device with the structured photoalignment material as claimed in claim 6.

8. A patterned optical or electro-optical element, system or device, comprising the structured photoalignment material as claimed in claim 6 and as prepared by a process comprising a) applying the composition, and then b) optionally drying, and then c) irradiating the applied composition (VII), obtained after step a) or step b), with the aligning polarized light to induce the anisotropy.

9. A method of using the structured photoalignment material as claimed in claim 6, comprising providing the structured photoalignment material as a structured photoalignment layer, for aligning organic or inorganic compounds, wherein the structured photoalignment material is prepared by a process comprising a) applying the composition, and then b) optionally drying, and then c) irradiating the applied composition (VII), obtained after step a) or step b), with the aligning polarized light to induce the anisotropy.

* * * * *